US012756832B2

(12) United States Patent
Piao et al.

(10) Patent No.: US 12,756,832 B2
(45) Date of Patent: Oct. 6, 2026

(54) ARTIFICIAL INTELLIGENCE BASED VIDEO DECODING APPARATUS AND VIDEO DECODING METHOD AND ARTIFICIAL INTELLIGENCE BASED VIDEO ENCODING APPARATUS AND VIDEO ENCODING METHOD WHICH PERFORM CHROMA COMPONENT PREDICTION

(71) Applicant: SAMSUNG ELECTRONICS CO., LTD., Suwon-si (KR)

(72) Inventors: Yinji Piao, Suwon-si (KR); Kyungah Kim, Suwon-si (KR); Minsoo Park, Suwon-si (KR); Minwoo Park, Suwon-si (KR); Kwangpyo Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 61 days.

(21) Appl. No.: 18/232,209

(22) Filed: Aug. 9, 2023

(65) Prior Publication Data

US 2024/0048711 A1 Feb. 8, 2024

Related U.S. Application Data

(63) Continuation of application No. PCT/KR2023/011145, filed on Jul. 31, 2023.

(30) Foreign Application Priority Data

Aug. 4, 2022 (KR) ........................ 10-2022-0097570

(51) Int. Cl.
*H04N 19/46* (2014.01)
*H04N 19/132* (2014.01)
(Continued)

(52) U.S. Cl.
CPC ......... *H04N 19/132* (2014.11); *H04N 19/176* (2014.11); *H04N 19/186* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 10,075,709 | B2 | 9/2018 | Xu et al. |
| 11,218,701 | B2 | 1/2022 | Huo et al. |

(Continued)

FOREIGN PATENT DOCUMENTS

| | | | |
|---|---|---|---|
| CN | 110602491 | A | 12/2019 |
| CN | 111951164 | A1 | 11/2020 |

(Continued)

OTHER PUBLICATIONS

International Search Report and Written Opinion (PCT/ISA/210, PCT/ISA/220, PCT/ISA/237) issued Oct. 27, 2023 by the International Searching Authority in International Application No. PCT/KR2023/011145.

(Continued)

*Primary Examiner* — Samuel D Fereja
(74) *Attorney, Agent, or Firm* — Sughrue Mion, PLLC

(57) ABSTRACT

An artificial intelligence (AI)-based video decoding method comprises obtaining, from a bitstream, a joint chroma residual sample of a current block, Cb component prediction information of the current block, and Cr component prediction information of the current block; determining a prediction sample of the Cb component of the current block based on at least the Cb component prediction information; determining a prediction sample of the Cr component of the current block based on at least the Cr component prediction information; and reconstructing the current block by obtain- (Continued)

ing a reconstructed sample of the Cb component of the current block and a reconstructed sample of the Cr component of the current block from an output of a neural network by inputting the joint chroma residual sample, the prediction sample of the Cb component, and the prediction sample of the Cr component to the neural network.

14 Claims, 16 Drawing Sheets

(51) Int. Cl.
*H04N 19/176* (2014.01)
*H04N 19/186* (2014.01)

(56) References Cited

U.S. PATENT DOCUMENTS

| | | | | |
|---|---|---|---|---|
| 11,265,581 | B2 | 3/2022 | Zhao et al. | |
| 11,601,672 | B2 | 3/2023 | Pfaff et al. | |
| 12,022,060 | B2 | 6/2024 | Piao et al. | |
| 2020/0120340 | A1 | 4/2020 | Park et al. | |
| 2020/0402205 | A1 | 12/2020 | Su et al. | |
| 2021/0067802 | A1 | 3/2021 | Jin et al. | |
| 2021/0195201 | A1* | 6/2021 | Li | H04N 19/70 |
| 2022/0078418 | A1* | 3/2022 | Huang | G06N 3/04 |
| 2022/0109860 | A1* | 4/2022 | Chen | H04N 19/82 |
| 2023/0269383 | A1* | 8/2023 | Iwamura | H04N 19/46 375/240.03 |
| 2024/0137500 | A1* | 4/2024 | Pfaff | G06N 3/045 |
| 2024/0187599 | A1* | 6/2024 | Yoo | H04N 19/132 |

FOREIGN PATENT DOCUMENTS

| | | | |
|---|---|---|---|
| KR | 10-2018-0052651 | A | 5/2018 |
| KR | 10-2020-0016885 | A | 2/2020 |
| KR | 10-2020-0047563 | A | 5/2020 |
| KR | 10-2020-0128586 | A | 11/2020 |
| KR | 10-2022-0088682 | A | 6/2022 |
| KR | 10-2464910 | B1 | 11/2022 |

OTHER PUBLICATIONS

Jani Lainema, "CE7-related: Joint coding of chrominance residuals", Joint Video Experts Team (JVET) of ITU-T SG 16 WP 3 and ISO/IEC JTC 1/SC 29/WG 11, 13th Meeting: Marrakech, MA, Jan. 9, 2019, 5 pages.

Christian Helrich et al,, "CE7-related: Joint chroma residual coding with multiple modes (tests CE7-2.1, CE7-2.2)", Joint Video Experts Team (JVET) of ITU-T SG 16 WP 3 and ISO/IEC JTC 1/SC 29/WG 11, 15th Meeting: Gothenburg, SE, Jul. 3, 2019, 9 pages.

Communication issued Jul. 2, 2026 by the European Patent Office in European Patent Application No. 23850374.2.

Lainema, Jani, "CE7-related; Joint coding of chrominance residuals". Joint Video Experts Team (JVET) of ITU-T SG 16 WP 3 and ISO/IEC JTC 1/SC 29/WG 11, 13th Meeting: Marrakech, MA, Jan. 16, 2019, Document: JVET-M0305, XP030202337. (5 pages total).

Zhu, Linwei et al., "Deep Learning-Based Chroma Prediction for Intra Versatile Video Coding", IEEE Transactions On Circuits and Systems for Video Technology, vol. 31, No. 8, Nov. 3, 2020, pp. 3168-3181. XP011870243 [retrieved Aug. 2, 2021]. (14 pages total).

Helmrich, Christian et al., "CE7-related: Joint chroma residual coding with multiple modes", Joint Video Experts Team (JVET) of ITU-T SG 16 WP 3 and ISO/IEC JTC 1/SC 29/WG 11, 14th Meeting: Geneva, CH, Mar. 13, 2019, Document: WET-N0282-v1, XP030210035. (8 pages total).

* cited by examiner

FIG. 2

| tu_cbf_cb | tu_cbf_cr | reconstruction of Cb and Cr residuals | mode |
|---|---|---|---|
| 1 | 0 | resCb[x][y] = resJointC[x][y]<br>resCr[x][y] = (CSign*resJointC[x][y])>>1 | 1 |
| 1 | 1 | resCb[x][y] = resJointC[x][y]<br>resCr[x][y] = CSign*resJointC[x][y] | 2 |
| 0 | 1 | resCb[x][y] = (CSign*resJointC[x][y])>>1<br>resCr[x][y] = resJointC[x][y] | 3 |

FIG. 7

| PREDICTION TYPE | NEURAL NETWORK |
|---|---|
| INTRA | MODEL1, MODEL2, MODEL3 |
| INTER | MODEL1, MODEL2 |

FIG. 8

| PREDICTION TYPE | NEURAL NETWORK |
|---|---|
| INTRA | [1, MODEL1], [MODEL2], [MODEL3, 1] |
| INTER | [1, MODEL2] |

FIG. 10

| PREDICTION TYPE | SCALE FACTOR SET |
|---|---|
| INTRA | 1, 1/2, 1/4 |
| INTER | 1, 1/2 |

ARTIFICIAL INTELLIGENCE BASED VIDEO DECODING APPARATUS AND VIDEO DECODING METHOD AND ARTIFICIAL INTELLIGENCE BASED VIDEO ENCODING APPARATUS AND VIDEO ENCODING METHOD WHICH PERFORM CHROMA COMPONENT PREDICTION

CROSS-REFERENCE TO RELATED APPLICATIONS

This application is a continuation of International Application No. PCT/KR2023/011145, filed on Jul. 31, 2023, in the Korean Intellectual Property Receiving Office and claims priority to Korean Patent Application No. 10-2022-0097570, filed on Aug. 4, 2022, in the Korean Intellectual Property Office, the disclosures of which are incorporated by reference herein in their entireties.

BACKGROUND

1. Field

The disclosure relates to a video decoding method and apparatus and a video encoding method and apparatus, and more particularly, to methods and apparatuses for performing, based on artificial intelligence (AI), prediction on Cb and Cr components which are chroma components of an image.

2. Description of Related Art

A codec such as H.266 versatile video coding (VVC) jointly encodes and decodes residual samples of a Cb component and a Cr component via joint coding by using a similarity or relation between the Cb component and the Cr component so as to save a bitrate of separate coding for each component of chroma.

The relation between the Cb component and the Cr component is adaptively selected based on a determined number of cases, such that a joint chroma residual sample for the Cb component and the Cr component is encoded and decoded.

Although a rule-based chroma component prediction algorithm has shown good performance, as a resolution of an image increases and content of an image diversifies, an artificial intelligence (AI)-based chroma component prediction algorithm that may flexibly consider characteristics of an image may be implemented.

SUMMARY

According to an embodiment of the disclosure, an artificial intelligence (AI)-based video decoding method comprises: obtaining, from a bitstream, a joint chroma residual sample of a current block, Cb component prediction information of the current block, and Cr component prediction information of the current block, the current block comprising a Cb component and a Cr component; determining a prediction sample of the Cb component of the current block based on at least the Cb component prediction information; determining a prediction sample of the Cr component of the current block based on at least the Cr component prediction information; and reconstructing the current block by obtaining a reconstructed sample of the Cb component of the current block and a reconstructed sample of the Cr component of the current block from an output of a neural network by inputting the joint chroma residual sample, the prediction sample of the Cb component, and the prediction sample of the Cr component to the neural network.

According to an embodiment of the disclosure, an artificial intelligence (AI)-based video decoding apparatus comprising: a memory storing at least one instruction; and at least one processor configured to operate according to the at least one instruction. The at least one processor is further configured to obtain, from a bitstream, a joint chroma residual sample of a current block, Cb component prediction information of the current block, and Cr component prediction information of the current block, the current block comprising a Cb component and a Cr component. The at least one processor is further configured to determine a prediction sample of the Cb component of the current block based on at least the Cb component prediction information. The at least one processor is further configured to determine a prediction sample of the Cr component of the current block based on at least the Cr component prediction information. The at least one processor is further configured to reconstruct the current block by obtaining a reconstructed sample of the Cb component of the current block and a reconstructed sample of the Cr component of the current block from an output of a neural network by inputting the joint chroma residual sample, the prediction sample of the Cb component, and the prediction sample of the Cr component to the neural network.

According to an embodiment of the disclosure, an artificial intelligence (AI)-based video encoding method comprises: generating an initial joint chroma residual sample of a current block, Cb component prediction information of the current block, and Cr component prediction information of the current block; determining a prediction sample of the Cb component of the current block based on at least the Cb component prediction information, determining a prediction sample of the Cr component of the current block based on at least the Cr component prediction information; and encoding a joint chroma residual sample of the current block by obtaining a reconstructed sample of the Cb component of the current block and a reconstructed sample of the Cr component of the current block from an output of a neural network by inputting the initial joint chroma residual sample, the prediction sample of the Cb component, and the prediction sample of the Cr component to the neural network.

According to an embodiment of the disclosure, an AI-based video encoding apparatus may include a memory storing at least one instruction, and at least one processor configured to operate according to the at least one instruction. The at least one processor may be further configured to generate an initial joint chroma residual sample of a current block, Cb component prediction information of the current block, and Cr component prediction information of the current block. The at least one processor is further configured to determine a prediction sample of the Cb component of the current block based on at least the Cb component prediction information. The at least one processor is further configured to determine a prediction sample of the Cr component of the current block based on at least the Cr component prediction information. The at least one processor is further configured to encode a joint chroma residual sample of the current block by obtaining a reconstructed sample of the Cb component of the current block and a reconstructed sample of the Cr component of the current block from an output of a neural network by inputting the initial joint chroma residual sample, the prediction sample of the Cb component, and the prediction sample of the Cr component to the neural network.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates a diagram for describing a relation expression between a Cb component, a Cr component, and a joint chroma residual, according to an embodiment of the disclosure;

FIG. 7 shows a table illustrating a correlation between neural network models for AI-based chroma component prediction and prediction types according to an embodiment of the disclosure;

FIG. 8 shows a table illustrating a correlation between neural network models for AI-based chroma component prediction and prediction types according to an embodiment of the disclosure;

FIG. 10 shows a table illustrating a correlation between a scale factor set and a prediction type according to an embodiment of the disclosure;

DETAILED DESCRIPTION

Figure 1:
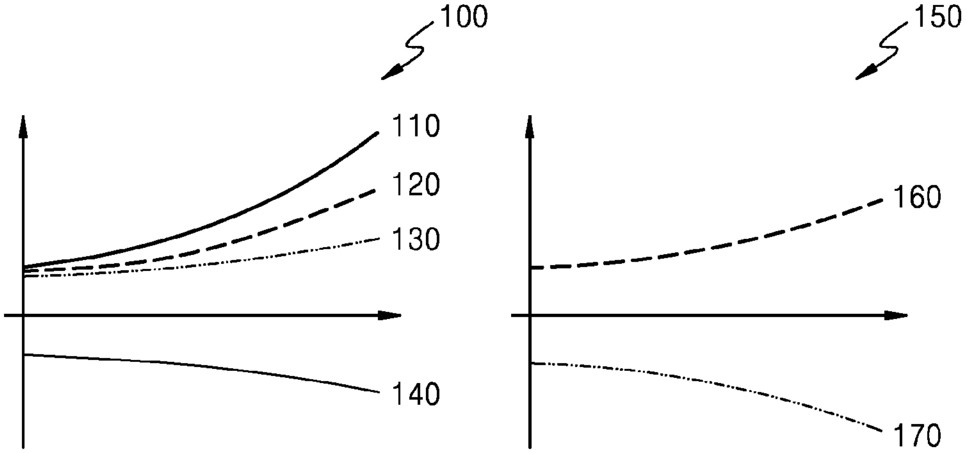
FIG. 1 illustrates a diagram for describing a relation between a Cb component, a Cr component, and a joint chroma residual, according to an embodiment of the disclosure.

As the disclosure allows for various changes and numerous embodiments, particular embodiments will be illustrated in the drawings and described in detail in the written descriptions. However, this is not intended to limit the disclosure to particular modes of practice, and it is to be appreciated that all changes, equivalents, and substitutes that do not depart from the spirit and technical scope of the disclosure are encompassed in the disclosure.

In the descriptions of an embodiment of the disclosure, detailed explanations of the related art are omitted when it is deemed that they may unnecessarily obscure the essence of the disclosure. Also, numerals (e.g., "first", "second", and the like) in descriptions of the specification are used only to distinguish one element from another element.

Throughout the disclosure, the expression "at least one of a, b, or c" indicates only a, only b, only c, both a and b, both a and c, both b and c, all of a, b, and c, or variations thereof.

In the disclosure, it will also be understood that, when an element is referred to as being "connected to" or "coupled with" another element, it can be directly connected to or coupled with the other element, or it can be indirectly connected to or coupled with the other element by having an intervening element interposed therebetween.

In the disclosure, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another element.

Also, in the disclosure, an 'image' or a 'picture' may refer to a still image, a moving image including a plurality of consecutive still images (or frames), or a video.

Also, in the disclosure, a 'neural network' is a representative example of an artificial neural network model simulating brain nerves, and is not limited to an artificial neural network model using a specific algorithm. The neural network may be referred to as a deep neural network.

Also, in the disclosure, a 'weight' is a value used in an operation process of each layer constituting a neural network, and, for example, may be used when an input value is applied to a predetermined operation expression. The weight is a value set as a result of training, and may be updated by using separate training data.

Also, in the disclosure, a 'current block' refers to a block that is a current target to be processed. The current block may be a slice, a tile, a largest coding unit, a coding unit, a prediction unit, or a transformation unit, which is split from a current image.

Also, in the disclosure, a 'sample' is data allocated to a sampling position in data of an image, a block, a filter kernel, a feature map, or the like, and refers to data to be processed. For example, the sample may include a pixel in a two-dimensional image.

Hereinafter, with reference to FIGS. 1 and 2, a method of predicting a chroma component without a neural network will be described.

FIG. 1 illustrates a diagram for describing a relation between a Cb component, a Cr component, and a joint chroma residual, according to an embodiment of the disclosure.

Referring to FIG. 1, the graph 100 shows a relation between an actual value 140 of a residual sample of the Cr component, an actual value 110 of a residual sample of the Cb component, and a joint chroma residual sample 120 in a video encoding procedure. The joint chroma residual sample 120 may be determined as a mean value between a value 130 obtained by multiplying −1 by the actual value 140 of the residual sample of the Cr component, and the actual value 110 of the residual sample of the Cb component.

The graph 150 shows an example of residual sample 160 of the Cb component and a residual sample 170 of the Cr component, which may be obtained by using a joint chroma residual sample 140 in a video decoding procedure. In detail, a same value as the joint chroma residual sample 140 may be determined as a reconstructed value of the residual sample 160 of the Cb component, and a value generated by multiplying −1 by the joint chroma residual sample 140 may be determined as a reconstructed value of the residual sample 170 of the Cr component.

FIG. 2 illustrates a diagram for describing a relation expression between a Cb component, a Cr component, and a joint chroma residual, according to an embodiment of the disclosure.

Referring to FIG. 2, tu_cbf_cb may be a syntax element corresponding to Cb coded block flag (cbf) information, and may indicate whether a current transformation block includes a Cb component of which transformation coefficient level is not zero. The parameter tu_cbf_cr may be a syntax element corresponding to Cr cbf information, and may indicate whether the current transformation block includes a Cr component of which transformation coefficient level is not zero. The parameter tu_joint_cbcr_residual_flag may be a syntax element corresponding to joint chroma information, and may indicate whether one chroma sample is encoded to indicate a residual sample of the Cb component and a residual sample of the Cr component corresponding thereto in the current transformation block.

In a video decoding procedure, sps_joint_cbcr_enabled_flag may be obtained from a sequence parameter set. When sps_joint_cbcr_enabled_flag indicates 1, it means that a joint chroma scheme is allowed, in which one chroma sample is encoded to indicate a residual sample of a Cb component and a residual sample of a Cr component corresponding thereto in a block included in a current sequence.

Therefore, in a case where, first, the joint chroma scheme is allowed via sps_joint_cbcr_enabled_flag in the current sequence, a prediction type of a coding unit including the current transformation block is an intra prediction type, and Cr cbf information or Cb cbf information indicates 1, tu_joint_cbcr_residual_flag that is joint chroma information may be obtained. Also, in a case where the prediction type of the coding unit including the current transformation block is an inter prediction type, the parameter tu_joint_cbcr_residual_flag that is joint chroma information may be obtained only when both Cr cbf information and Cb cbf information indicate 1.

Therefore, in a case where the prediction type of the coding unit is the intra prediction type, and a current block includes a Cr component of which transformation coefficient level is 1 or includes a Cb component of which transformation coefficient level is 1, it may be determined via the joint chroma information whether one chroma sample is encoded to indicate a residual sample of the Cb component and a residual sample of the Cr component corresponding thereto. In a case where the prediction type of the coding unit is the inter prediction type, and the current block includes the Cr component of which transformation coefficient level is 1 and includes the Cb component of which transformation coefficient level is 1, it may be determined via the joint chroma information whether one chroma sample is encoded to indicate the residual sample of the Cb component and the residual sample of the Cr component corresponding thereto. Here, when the obtained joint chroma information indicates 0, it means that each of the residual sample of the Cb component and the residual sample of the Cr component corresponding thereto may be obtained from a bitstream. On the other hand, when the joint chroma information indicates 1, it means that one chroma sample is obtained from a bitstream, and the residual sample of the Cb component and the residual sample of the Cr component corresponding thereto may be reconstructed from the one chroma sample.

When Cb cbf information (tu_cbf_cb) and Cr cbf information (tu_cbf_cr) are obtained, weights for determining a reconstructed value (resCb) of the residual sample of the Cb component and a reconstructed value (resCr) of the residual sample of the Cr component according to the Cb cbf information and the Cr cbf information may be determined.

For example, when tu_cbf_cb is 1 and tu_cbf_cr is 0, the reconstructed value (resCb) of the residual sample of the Cb component may be determined as the same value as a joint chroma residual sample (resJointC) and the reconstructed value (resCr) of the residual sample of the Cr component may be determined as a value obtained by multiplying ±½ by the joint chroma residual sample (resJointC) based on CSign value obtained from a picture parameter set. In this case, a weight of the Cb component is 1, a weight of the Cr component is ±½, and a joint mode index is 1.

For example, when tu_cbf_cb is 1 and tu_cbf_cr is 1, the reconstructed value (resCb) of the residual sample of the Cb component may be determined as the same value as the joint chroma residual sample (resJointC) and the reconstructed value (resCr) of the residual sample of the Cr component may be determined as a value obtained by multiplying ±1 by the joint chroma residual sample (resJointC) based on CSign value. In this case, a weight of the Cb component is 1, a weight of the Cr component is ±1, and the joint mode index is 2.

For example, when tu_cbf_cb is 0 and tu_cbf_cr is 1, the reconstructed value (resCb) of the residual sample of the Cb component may be determined as a value obtained by multiplying ±½ by the joint chroma residual sample (resJointC) based on CSign value and the reconstructed value (resCr) of the residual sample of the Cr component may be determined as the same value as the joint chroma residual sample (resJointC). In this case, a weight of the Cb component is ±½, a weight of the Cr component is 1, and the joint mode index is 3.

When the prediction type of the coding unit is an intra prediction mode, index values 1, 2, and 3 are all available for the joint mode index. For example, when the prediction type of the coding unit is the intra prediction mode, each of a weight of the Cb component and a weight of the Cr component may be determined according to the joint mode index.

When the prediction type of the coding unit is an inter prediction mode, only the joint mode index of 2 may be allowed. Therefore, in a case where the prediction type of the coding unit is the inter prediction mode and the joint mode index is 2 (e.g., only when tu_cbf_cb is 1 and tu_cbf_cr is 1), the joint chroma scheme may be allowed, the weight of the Cb component may be determined as 1, and the weight of the Cr component may be determined as ±1.

Hereinafter, with reference to FIGS. 3 to 16, a method of predicting, based on artificial intelligence (AI), a chroma component by using a neural network will now be described.

Figure 3:
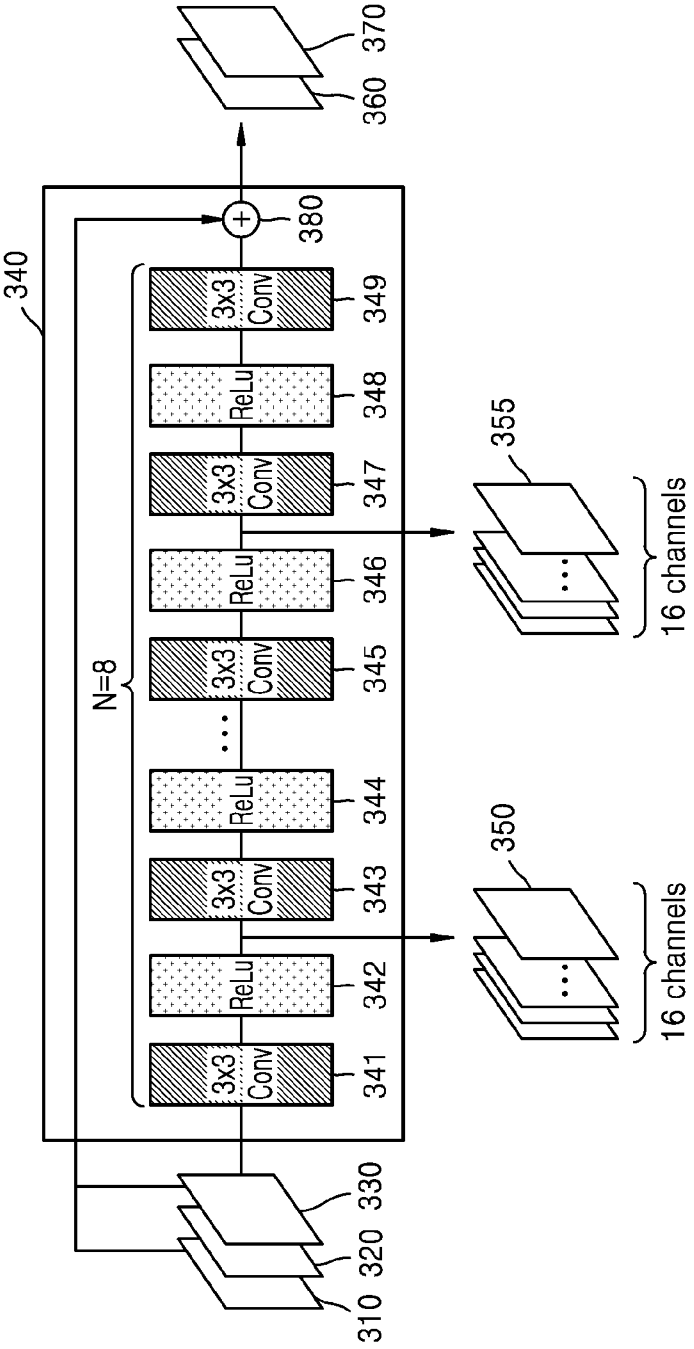
FIG. 3 illustrates a diagram for describing a neural network for artificial intelligence (AI)-based chroma component prediction according to an embodiment of the disclosure.

FIG. 3 illustrates a diagram for describing a neural network for AI-based chroma component prediction according to an embodiment of the disclosure.

As illustrated in FIG. 3, a neural network 340 may include a first convolutional layer 341, a first activation layer 342, a second convolutional layer 343, a second activation layer 344, a third convolutional layer, a third activation layer, a fourth convolutional layer, a fourth activation layer, a fifth convolutional layer, a fifth activation layer, a sixth convolutional layer, a sixth activation layer, a seventh convolutional layer 345, a seventh activation layer 346, an eighth convolutional layer 347, an eighth activation layer 348, a ninth convolutional layer 349 and a summation layer 380. The summation layer 380 may be referred to as an adder.

A prediction sample 310 of a Cb component of a current block, a joint chroma residual sample 320 of the current block, and a prediction sample 330 of a Cr component of the current block are input to the first convolutional layer 341. The prediction sample 310 of the Cb component of the current block, the joint chroma residual sample 320 of the current block, and the prediction sample 330 of the Cr component of the current block may be concatenated as one data item that is input to the first convolutional layer 341.

According to the illustration, the first convolutional layer 341 is marked with 3×3, which means that convolution processing is performed on the prediction sample 310 of the Cb component of the current block, the joint chroma residual sample 320 of the current block, and the prediction sample 330 of the Cr component of the current block by using a filter kernel having a size of 3×3. In an embodiment of the disclosure, there may be 16 channels 350 as shown in FIG. 3. Therefore, according to a convolution processing result, feature maps of the 16 channels 350 may be generated by 16 filter kernels each having a size of 3×3.

A feature map generated by the first convolutional layer 341 may indicate unique features of the prediction sample 310 of the Cb component of the current block, the joint chroma residual sample 320 of the current block, and the prediction sample 330 of the Cr component of the current block. For example, the feature map may indicate a vertical direction feature, a horizontal direction feature, or an edge feature of the prediction sample 310 of the Cb component of the current block, the joint chroma residual sample 320 of the current block, and the prediction sample 330 of the Cr component of the current block. In an embodiment of the disclosure, a feature map may be generated for each of the prediction sample 310 of the Cb component of the current block, the joint chroma residual sample 320 of the current block, and the prediction sample 330 of the Cr component of the current block.

The feature map output from the first convolutional layer 341 is input to the first activation layer 342.

The first activation layer 342 may apply a non-linear feature to the feature map. A non-linear feature may be a feature demonstrating one or more non-linear characteristics. The first activation layer 342 may include a sigmoid function, a Tanh function, and a rectified linear unit (ReLU) function, or any other suitable function known to one of ordinary skill in the art.

The application of the non-linear feature by the first activation layer 342 to the feature map may indicate that some sample values of the feature map are changed. Here, the change may be performed by having the non-linear feature applied thereto.

The first activation layer 342 may determine whether to deliver sample values of the feature map to the second convolutional layer 343. For example, some sample values from among the sample values of the feature map may be activated by the first activation layer 342 and may be delivered to the second convolutional layer 343, and some sample values may be deactivated by the first activation layer 342 and may not be delivered to the second convolutional layer 343. The unique features of the prediction sample 310 of the Cb component of the current block, the joint chroma residual sample 320 of the current block, and the prediction sample 330 of the Cr component of the current block which are indicated by the feature map may be emphasized by the first activation layer 342.

The feature maps of the 16 channels 350 output from the first activation layer 342 are output to the second convolutional layer 343.

According to the illustration, the second convolutional layer 343 is marked with 3×3, which may mean that convolution processing is performed on the input feature map, by using a filter kernel having a size of 3×3. An output from the second convolutional layer 343 is input to the second activation layer 344. The second activation layer 344 may apply a non-linear feature to the input feature map.

The feature map output from the second activation layer 344 passes through repetitive operations at a convolutional layer and an activation layer and is sequentially input to and output from the third convolutional layer, the third activation layer, the fourth convolutional layer, the fourth activation layer, the fifth convolutional layer, the fifth activation layer, and the sixth convolutional layer, and the sixth activation layer. An output from the sixth activation layer is input back to the seventh convolutional layer 345.

According to the illustration, the seventh convolutional layer 345 is marked with 3×3, which may mean that convolution processing is performed on the input feature map, by using a filter kernel having a size of 3×3. An output from the seventh convolutional layer 345 is input to the seventh activation layer 346. Feature maps of 16 channels 355 output from the seventh activation layer 346 are input back to the eighth convolutional layer 347, and an output from the eighth convolutional layer 347 is input to the eighth activation layer 348.

An output from the eighth activation layer 348 is input to the ninth convolutional layer 349. The ninth convolutional layer 349 outputs two feature maps by using two filter kernels each having a size of 3×3.

The two feature maps output from the ninth convolutional layer 349 are respectively summed up with the prediction sample 310 of the Cb component of the current block and the prediction sample 330 of the Cr component of the current block at the summation layer 380, and as a result of the summing, a reconstructed sample 360 of the Cb component of the current block and a reconstructed sample 370 of the Cr component of the current block are output.

As the two feature maps output from the ninth convolutional layer 349 are respectively summed up with the prediction sample 310 of the Cb component of the current block and the prediction sample 330 of the Cr component of the current block, and thus, the reconstructed sample 360 of the Cb component of the current block and the reconstructed sample 370 of the Cr component of the current block are output, the two feature maps output from the ninth convolutional layer 349 may be respectively referred to as a residual sample of the Cb component of the current block and a residual sample of the Cr component of the current block.

While FIG. 3 illustrates that the neural network 340 includes 9 convolutional layers and 8 activation layers, this is merely an example, and according to an embodiment of the disclosure, the number of convolutional layers and activation layers included in the neural network 340 may vary.

According to an embodiment of the disclosure, the neural network 340 may be implemented via a recurrent neural network (RNN). For example, a convolutional neural network (CNN) structure of the neural network 340 according to an embodiment of the disclosure may be changed to an RNN structure.

As the neural network 340 of FIG. 3 includes the summation layer 380, the reconstructed sample 360 of the Cb component of the current block and the reconstructed sample 370 of the Cr component of the current block may be obtained from the neural network 340. A neural network not including the summation layer 380 will be described with reference to FIG. 4.

Figure 4:
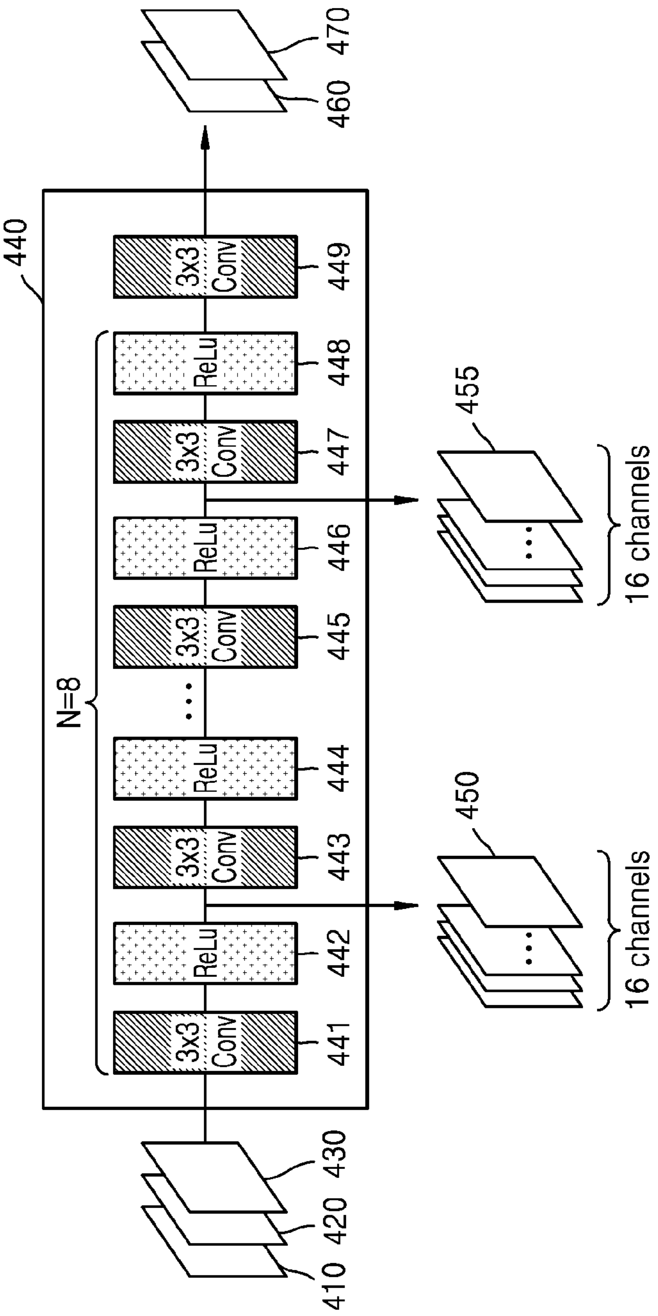
FIG. 4 illustrates a diagram for describing a neural network for AI-based chroma component prediction according to an embodiment of the disclosure.

FIG. 4 illustrates a diagram for describing a neural network for AI-based chroma component prediction according an embodiment of the disclosure.

As illustrated in FIG. 4, a neural network 440 may include a first convolutional layer 441, a first activation layer 442, a second convolutional layer 443, a second activation layer 444, a third convolutional layer, a third activation layer, a fourth convolutional layer, a fourth activation layer, a fifth convolutional layer, a fifth activation layer, a sixth convolutional layer, a sixth activation layer, a seventh convolutional layer 445, a seventh activation layer 446, an eighth convolutional layer 447, an eighth activation layer 448, and a ninth convolutional layer 449.

A prediction sample 410 of a Cb component of a current block, a joint chroma residual sample 420 of the current block, and a prediction sample 430 of a Cr component of the current block are input to the first convolutional layer 441. The prediction sample 410 of the Cb component of the current block, the joint chroma residual sample 420 of the current block, and the prediction sample 430 of the Cr component of the current block may be concatenated as one data item that is input to the first convolutional layer 441.

According to the illustration, the first convolutional layer 441 is marked with 3×3, which may mean that convolution processing is performed on the prediction sample 410 of the Cb component of the current block, the joint chroma residual sample 420 of the current block, and the prediction sample 430 of the Cr component of the current block by using a filter kernel having a size of 3×3. In an embodiment of the disclosure, there may be 16 channels as shown in FIG. 4. Therefore, according to a convolution processing result, feature maps of the 16 channels 450 may be generated by 16 filter kernels each having a size of 3×3.

A feature map generated by the first convolutional layer 441 may indicate unique features of the prediction sample 410 of the Cb component of the current block, the joint chroma residual sample 420 of the current block, and the prediction sample 430 of the Cr component of the current block. For example, the feature map may indicate a vertical direction feature, a horizontal direction feature, or an edge feature of the prediction sample 410 of the Cb component of the current block, the joint chroma residual sample 420 of the current block, and the prediction sample 430 of the Cr component of the current block. In an embodiment of the disclosure, a feature map may be generated for each of the prediction sample 310 of the Cb component of the current block, the joint chroma residual sample 320 of the current block, and the prediction sample 330 of the Cr component of the current block.

The feature map output from the first convolutional layer 441 is input to the first activation layer 442.

The first activation layer 442 may apply a non-linear feature to the feature map. A non-linear feature may be a feature demonstrating one or more non-linear characteristics. The first activation layer 442 may include a sigmoid function, a Tanh function, and a ReLU function, or any other suitable function known to one of ordinary skill in the art.

The application of the non-linear feature by the first activation layer 442 to the feature map may indicate that some sample values of the feature map are changed. Here, the change may be performed by having the non-linear feature applied thereto.

The first activation layer 442 may determine whether to deliver sample values of the feature map to the second convolutional layer 443. For example, some sample values from among the sample values of the feature map may be activated by the first activation layer 442 and may be delivered to the second convolutional layer 443, and some sample values may be deactivated by the first activation layer 442 and may not be delivered to the second convolutional layer 443. The unique features of the prediction sample 410 of the Cb component of the current block, the joint chroma residual sample 420 of the current block, and the prediction sample 430 of the Cr component of the current block which are indicated by the feature map may be emphasized by the first activation layer 442.

The feature maps of the 16 channels 450 output from the first activation layer 442 are output to the second convolutional layer 443.

According to the illustration, the second convolutional layer 443 is marked with 3×3, which may mean that convolution processing is performed on the input feature map, by using a filter kernel having a size of 3×3. An output from the second convolutional layer 443 is input to the second activation layer 444. The second activation layer 444 may apply a non-linear feature to the input feature map.

The feature map output from the second activation layer 444 passes through repetitive operations at a convolutional layer and an activation layer and is sequentially input to and output from the third convolutional layer, the third activation layer, the fourth convolutional layer, the fourth activation layer, the fifth convolutional layer, the fifth activation layer, and the sixth convolutional layer, and the sixth activation layer. An output from the sixth activation layer is input back to the seventh convolutional layer 445.

According to the illustration, the seventh convolutional layer 445 is marked with 3×3, which may mean that convolution processing is performed on the input feature map, by using a filter kernel having a size of 3×3. An output from the seventh convolutional layer 445 is input to the seventh activation layer 446. Feature maps of 16 channels 455 output from the seventh activation layer 446 are input back to the eighth convolutional layer 447, and an output from the eighth convolutional layer 447 is input to the eighth activation layer 448.

An output from the eighth activation layer 448 is input to the ninth convolutional layer 449. The ninth convolutional layer 449 outputs two feature maps by using two filter kernels each having a size of 3×3.

The two feature maps output from the ninth convolutional layer 449 may be respectively referred to as a residual sample 460 of the Cb component of the current block and a residual sample 470 of the Cr component of the current block.

While FIG. 4 illustrates that the neural network 440 includes 9 convolutional layers and 8 activation layers, this is merely an example, and according to an embodiment of the disclosure, the number of convolutional layers and activation layers included in the neural network 440 may vary.

Also, according to an embodiment of the disclosure, the neural network 440 may be implemented via an RNN. For example, a CNN structure of the neural network 440 according to an embodiment of the disclosure is changed to an RNN structure.

The residual sample 460 of the Cb component of the current block and the residual sample 470 of the Cr component of the current block may be obtained from the neural network 440.

Figure 5:
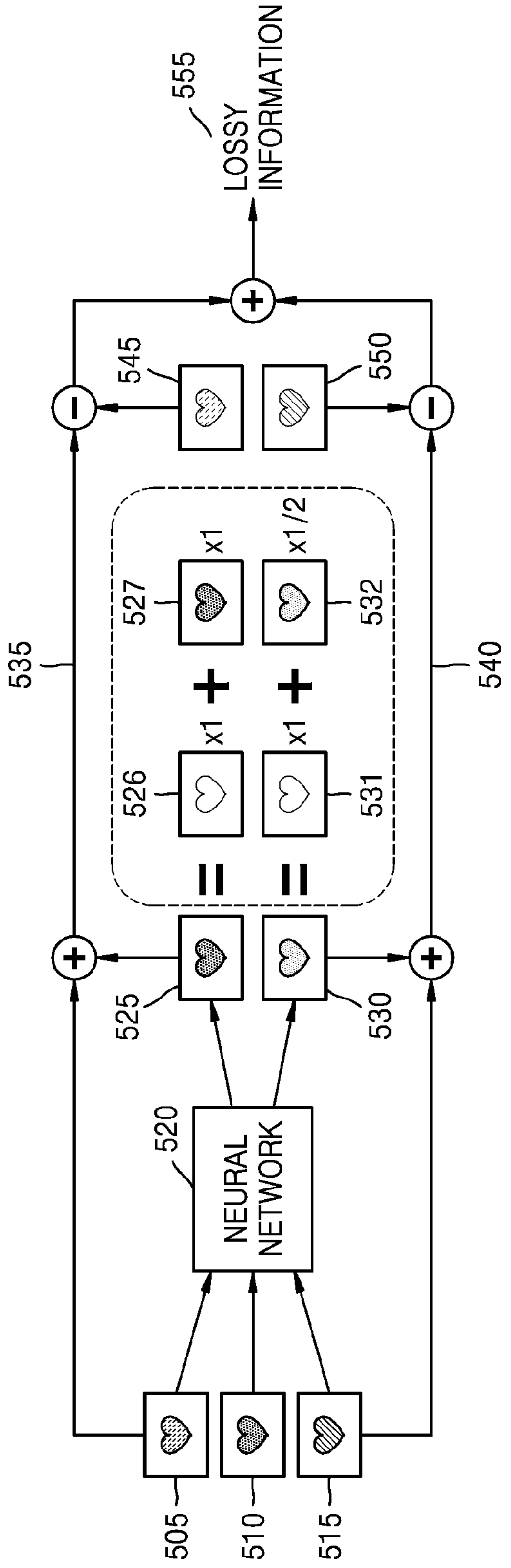
FIG. 5 illustrates a diagram for describing a method of training a neural network for AI-based chroma component prediction according to an embodiment of the disclosure.

FIG. 5 illustrates a diagram for describing a method of training a neural network for AI-based chroma component prediction according to an embodiment of the disclosure.

FIG. 5 illustrates a method of training a neural network 520 for AI-based chroma component prediction. A prediction sample 505 of a Cb component of a current block for training shown in FIG. 5 may correspond to the prediction sample of the Cb component of the current block described above, a joint chroma residual sample 510 of the current block for training may correspond to the joint chroma residual sample of the current block described above, and a prediction sample 515 of a Cr component of the current block for training may correspond to the prediction sample of the Cr component of the current block described above.

According to the method of training the neural network 520 of the disclosure, in accordance with an embodiment, the neural network 520 is trained such that a reconstructed sample 535 of the Cb component of the current block for training that is a result of summing up a residual sample 525 of the Cb component of the current block for training output from the neural network 520 and the prediction sample 505 of the Cb component of the current block for training becomes equal or similar to an original sample 545 of the Cb component of the current block for training, and a reconstructed sample 540 of the Cr component of the current block for training that is a result of summing up a residual sample 530 of the Cr component of the current block for training output from the neural network 520 and the prediction sample 515 of the Cr component of the current block for training becomes equal or similar to an original sample 550 of the Cr component of the current block for training. For example, lossy information 555 corresponding to a total sum of a difference between the reconstructed sample 535 of the Cb component of the current block for training and the original sample 545 of the Cb component of the current block for training and a difference between the reconstructed sample 540 of the Cr component of the current block for training and the original sample 550 of the Cr component of the current block for training may be used to train the neural network 520.

In more detail, first, the prediction sample 505 of the Cb component of the current block for training, the joint chroma residual sample 510 of the current block for training, and the prediction sample 515 of the Cr component of the current block for training are obtained. For example, the prediction sample 505 of the Cb component may be determined based on at least Cb component prediction information obtained from a bitstream, and the prediction sample 515 of the Cr component of the current block may be determined based on at least Cr component prediction information obtained from the bitstream.

The prediction sample 505 of the Cb component of the current block for training, the joint chroma residual sample 510 of the current block for training, and the prediction sample 515 of the Cr component of the current block for training are input to the neural network 520, and then the residual sample 525 of the Cb component of the current block for training and the residual sample 530 of the Cr component of the current block for training output from the neural network 520 are obtained. The neural network 520 may operate according to a predetermined weight.

The residual sample 525 of the Cb component of the current block for training is summed up with the prediction sample 505 of the Cb component of the current block for training such that the reconstructed sample 535 of the Cb component of the current block for training is obtained, and the residual sample 530 of the Cr component of the current block for training is summed up with the prediction sample 515 of the Cr component of the current block for training such that the reconstructed sample 540 of the Cr component of the current block for training is obtained.

The lossy information 555 corresponding to a total sum of the difference between the reconstructed sample 535 of the Cb component of the current block for training and the original sample 545 of the Cb component of the current block for training and the difference between the reconstructed sample 540 of the Cr component of the current block for training and the original sample 550 of the Cr component of the current block for training is output, and a weight set for the neural network 520 is updated according to the lossy information 555. The neural network 520 may update the weight to decrease or minimize the lossy information 555.

A heart shape shown in FIG. 5 may correspond to an example object in the current block for training and a residual part may correspond to the background. With respect to the residual sample 525 of the Cb component of the current block for training output from the neural network 520, a weight of 1 may be applied to each of an object 526 and a background 527 of the current block for training, and with respect to the residual sample 530 of the Cr component of the current block for training, a weight of 1 may be applied to an object 531 of the current block for training and a weight of ½ may be applied to a background 532. Based on this configuration, a relation between a Cb component and a Cr component may become further normal, further local, and further specific by using prediction samples of the Cb component and the Cr component, via a trained neural network model. For example, instead of a fixed relation with respect to pixels corresponding to a Cb component and a Cr component, a Cb component and a Cr component may be reconstructed such that a Cb component and a Cr component different from each other may have a relation with respect to an object, a background, a foreground, or the like, or a Cb component and a Cr component different from each other may have a relation with respect to different parts of an object.

In an embodiment of the disclosure, the lossy information 555 may include at least one of an L1-norm value, an L2-norm value, a structural similarity (SSIM) value, a peak signal-to-noise ratio-human vision system (PSNR-HVS) value, a multiscale SSIM (MS-SSIM) value, a variance inflation factor (VIF) value or a video multimethod assessment fusion (VMAF) value with respect to the total sum of the difference between the reconstructed sample 535 of the Cb component of the current block for training and the original sample 545 of the Cb component of the current block for training and the difference between the reconstructed sample 540 of the Cr component of the current block for training and the original sample 550 of the Cr component of the current block for training.

According to an embodiment of the disclosure, training of the neural network 520 may be performed by a training apparatus. The training apparatus may be an AI-based video encoding apparatus 1600 or an AI-based video decoding apparatus 1300. According to an embodiment of the disclosure, the training apparatus may be an external server. In this case, the neural network 520 and weights trained by the external server may be transmitted to the AI-based video encoding apparatus 1600 or the AI-based video decoding apparatus 1300 over a network. Furthermore, the trained neural network may be downloaded by one or more devices.

According to an embodiment of the disclosure, another input may be added to the neural network 520, in addition to the prediction sample 505 of the Cb component of the current block for training, the joint chroma residual sample 510 of the current block for training, and the prediction sample 515 of the Cr component of the current block for training. For example, the added other input may be a quantization step size of a current block when the current block is an intra block or an inter block, a quantization error of the current block when the current block is an intra block or an inter block, a quantization step size or a quantization step error of a reference frame of the current block when the current block is an inter block, a block (e.g., when a chroma format is 4:2:0, the block is downscaled by 2) obtained by downsampling a reconstructed luma block based on the chroma format, the reconstructed luma block corresponding to a current chroma block of the current block, or any other suitable method.

The quantization error of the current block may include, as sample values, quantization error values calculated from a quantization parameter. This value may indicate a quantization error with respect to each sample included in the current block. A size of a quantization error map including quantization error values to be additionally input to a neural network may correspond to a size of the current block.

The quantization error values may indicate an error amount which may be caused due to quantization and inverse-quantization applied to residual samples in an encoding and decoding procedure with respect to an original block.

A large quantization error value may mean that a difference between a transformation coefficient before quantization and a transformation coefficient after inverse-quantization may be large. The larger the difference between the transformation coefficient before quantization and the transformation coefficient after inverse-quantization increases, the more the similarity between an original block and the current block obtained by decoding encoding data decreases.

As an error caused due to quantization and inverse-quantization corresponds to an artifact, AI-based video encoding and video decoding have to be performed by considering quantization error values.

In an embodiment of the disclosure, a quantization error value may be calculated by using Equation 1 below.

$$\text{quantization error value}=\text{quantization step size}\hat{\ }2/12 \quad \text{[Equation 1]}$$

Referring to Equation 1, the quantization error value may be proportional to a value obtained by squaring the quantization step size.

In an embodiment of the disclosure, the quantization step size is a value used to quantize a transformation coefficient, and the transformation coefficient may be quantized by dividing the transformation coefficient by the quantization step size. On the other hand, the quantized transformation coefficient may be inversely quantized by multiplying the quantized transformation coefficient by the quantization step size.

The quantization step size may be approximated by using Equation 2 below.

$$\text{quantization step size}=2\hat{\ }(\text{quantization parameter}/n)/\text{quantization scale[quantization parameter}\%n] \quad \text{[Equation 2]}$$

In Equation 2, quantization scale[quantization parameter % n] indicates a scale value indicated by the quantization parameter from among predetermined n scale values. In the high efficiency video coding (HEVC) codec, 6 scale values (26214, 23302, 20560, 18396, 16384 and 14564) are defined, and thus, according to the HEVC codec, n is 6.

Referring to Equation 1 and Equation 2, the more the quantization parameter increases, the more the quantization step size may increase, and the more the quantization error value may increase.

The neural network may additionally consider the quantization error or the quantization step size, thereby further efficiently removing a quantization error in a current block when the current block is reconstructed.

In an embodiment of the disclosure, the neural network may use a block obtained by downsampling a reconstructed luma block based on a chroma format, the reconstructed luma block corresponding to a current chroma block of the current block, and thus, may further efficiently reconstruct the current chroma block by using information of the reconstructed luma block.

According to an embodiment of the disclosure, a model of the neural network 520 may be plural in number. For example, one model from among a plurality of models may be selected according to whether a type of a slice including the current block is an intra slice or an inter slice.

According to an embodiment of the disclosure, a model of the neural network 520 may be plural in number. For example, one model from among a plurality of models may be selected according to whether an encoding block type of the current block is an intra block or an inter block.

According to an embodiment of the disclosure, a model of the neural network 520 may be plural in number. For example, one model from among a plurality of models may be selected according to a QP range of a slice including the current block. In detail, model 1 from the plurality of models may be selected when the QP range is equal to or greater than 0 and is less than a, model 2 from the plurality of models may be selected when the QP range is equal to or greater than a and is less than b, and model 3 from the plurality of models may be selected when the QP range is equal to or greater than b and is less than c.

According to an embodiment of the disclosure, a model of the neural network 520 may be plural in number. For example, one model from among a plurality of models may be selected based on a Cb component and a Cr component of the current block. In detail, one of residuals of the Cb component and the Cr component is changelessly used, weight 1 may be applied, and a model of the neural network may be applied to the other one of the residuals of the Cb component and the Cr component.

Figure 6:
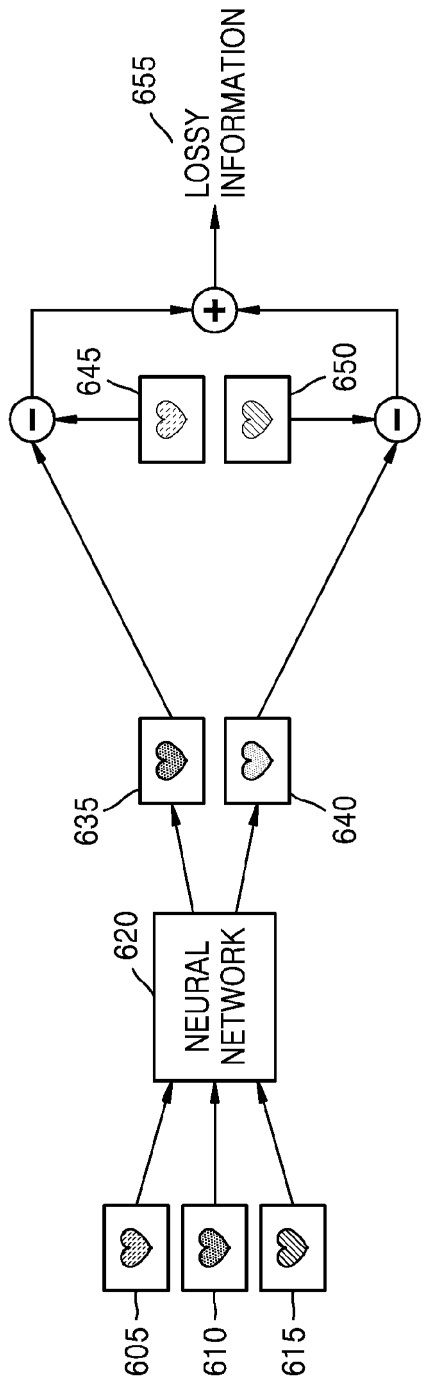
FIG. 6 illustrates a diagram for describing a method of training a neural network for AI-based chroma component prediction according to an embodiment of the disclosure.

FIG. 6 illustrates a diagram for describing a method of training a neural network for AI-based chroma component prediction according an embodiment of the disclosure.

Compared to the neural network 520 of FIG. 5, a neural network 620 of FIG. 6 is different in that an output of a neural network is a reconstructed sample of a Cb component and a reconstructed sample of a Cr component instead of a residual sample of the Cb component and a residual sample of the Cr component.

FIG. 6 illustrates a method of training the neural network 620 for AI-based chroma component prediction. A prediction sample 605 of a Cb component of a current block for training shown in FIG. 6 may correspond to the prediction sample of the Cb component of the current block described above, a joint chroma residual sample 610 of the current block for training may correspond to the joint chroma residual sample of the current block described above, and a prediction sample 615 of a Cr component of the current block for training may correspond to the prediction sample of the Cr component of the current block described above.

According to the method of training the neural network 620 of the disclosure, in accordance with an embodiment of the disclosure, the neural network 620 is trained such that a reconstructed sample 635 of the Cb component of the current block for training output from the neural network 620 becomes equal or similar to an original sample 645 of the Cb component of the current block for training, and a reconstructed sample 640 of the Cr component of the current block for training becomes equal or similar to an original sample 650 of the Cr component of the current block for training. For example, lossy information 655 corresponding to a total sum of a difference between the reconstructed sample 635 of the Cb component of the current block for training and the original sample 645 of the Cb component of the current block for training and a difference between the reconstructed sample 640 of the Cr component of the current block for training and the original sample 650 of the Cr component of the current block for training may be used to train the neural network 620.

In more detail, first, the prediction sample 605 of the Cb component of the current block for training, the joint chroma residual sample 610 of the current block for training, and the prediction sample 615 of the Cr component of the current block for training are obtained. For example, the prediction sample 605 of the Cb component may be determined based on at least Cb component prediction information obtained from a bitstream, and the prediction sample 615 of the Cr component of the current block may be determined based on at least Cr component prediction information obtained from the bitstream.

The prediction sample 605 of the Cb component of the current block for training, the joint chroma residual sample 610 of the current block for training, and the prediction sample 615 of the Cr component of the current block for training are input to the neural network 620, and then the reconstructed sample 635 of the Cb component of the current block for training and the reconstructed sample 640 of the Cr component of the current block for training output from the neural network 620 are obtained. The neural network 620 may operate according to a predetermined weight.

The lossy information 655 corresponding to a total sum of the difference between the reconstructed sample 635 of the Cb component of the current block for training and the original sample 645 of the Cb component of the current block for training and the difference between the reconstructed sample 640 of the Cr component of the current block for training and the original sample 650 of the Cr component of the current block for training is output, and a weight set for the neural network 620 is updated according to the lossy information 655. The neural network 620 may update the weight to decrease or minimize the lossy information 655.

The lossy information 655 may include at least one of an L1-norm value, an L2-norm value, an SSIM value, a PSNR-HVS value, an MS-SSIM value, a VIF value or a VMAF value with respect to the total sum of the difference between the reconstructed sample 635 of the Cb component of the current block for training and the original sample 645 of the Cb component of the current block for training and the difference between the reconstructed sample 640 of the Cr component of the current block for training and the original sample 650 of the Cr component of the current block for training.

According to an embodiment of the disclosure, training of the neural network 620 may be performed by a training apparatus. The training apparatus may be an AI-based video encoding apparatus 1500 or an AI-based video decoding apparatus 1200. According to an embodiment of the disclosure, the training apparatus may be an external server. In this case, the neural network 620 and weights trained by the external server may be transmitted to the AI-based video encoding apparatus 1500 or the AI-based video decoding apparatus 1200. In an embodiment of the disclosure, a trained neural network may be downloaded to one or more devices.

According to an embodiment of the disclosure, another input may be added to the neural network 620, in addition to the prediction sample 605 of the Cb component of the current block for training, the joint chroma residual sample 610 of the current block for training, and the prediction sample 615 of the Cr component of the current block for training. For example, the added other input may be a quantization step size of a current block, a quantization error of the current block, a quantization step size or a quantization step error of a reference frame of the current block when the current block is an inter block, a block (e.g., when a chroma format is 4:2:0, the block is downscaled by 2) obtained by downsampling a reconstructed luma block based on the chroma format, the reconstructed luma block corresponding to a current chroma block of the current block, or any other suitable method.

According to an embodiment of the disclosure, a model of the neural network 620 may be plural in number. For example, one model from among a plurality of models may be selected according to whether a type of a slice including the current block is an intra slice or an inter slice.

According to an embodiment of the disclosure, a model of the neural network 620 may be plural in number. For example, one model from among a plurality of models may be selected according to whether an encoding block type of the current block is an intra block or an inter block.

According to an embodiment of the disclosure, a model of the neural network 620 may be plural in number. For example, one model from among a plurality of models may be selected according to a QP range of a slice including the current block. In detail, model 1 from the plurality of models may be selected when the QP range is equal to or greater than 0 and is less than a, model 2 from the plurality of models may be selected when the QP range is equal to or greater than a and is less than b, and model 3 from the plurality of models may be selected when the QP range is equal to or greater than b and is less than c.

According to an embodiment of the disclosure, a model of the neural network 620 may be plural in number. For example, one model from among a plurality of models may be selected based on a Cb component and a Cr component of the current block. In detail, one of residuals of the Cb component and the Cr component is changelessly used, weight 1 may be applied, and a model of the neural network may be applied to the other one of the residuals of the Cb component and the Cr component.

FIG. 7 shows a table illustrating a correlation between neural network models for AI-based chroma component prediction and prediction types according to an embodiment of the disclosure. The correlation may be pre-stored in the AI-based video encoding apparatus 1500 or 1600 or the AI-based video decoding apparatus 1200 or 1300.

Referring to FIG. 7, neural network models may vary according to prediction types. When a prediction type is an intra prediction type, one model from among model 1, model 2, and model 3 of a plurality of models may be used, and when a prediction type is an inter prediction type, one model from among model 1 and model 2 of the plurality of models may be used.

Also, referring to FIG. 2 described above, a model to be used may vary according to the Cb cbf information (tu_cbf_cb) and the Cr cbf information (tu_cbf_cr).

In more detail, when the Cb cbf information (tu_cbf_cb) and the Cr cbf information (tu_cbf_cr) are obtained, a model for determining a reconstructed value (resCb) of the residual sample of the Cb component and a reconstructed value (resCr) of the residual sample of the Cr component according to the Cb cbf information and the Cr cbf information may be determined.

For example, when tu_cbf_cb is 1 and tu_cbf_cr is 0, a model for the reconstructed value (resCb) of the residual sample of the Cb component and the reconstructed value (resCr) of the residual sample of the Cr component may be determined as model 1 from among the neural network models. In this case, a joint mode index is 1.

For example, when tu_cbf_cb is 1 and tu_cbf_cr is 1, a model for the reconstructed value (resCb) of the residual sample of the Cb component and the reconstructed value (resCr) of the residual sample of the Cr component may be determined as model 2 from among the neural network models. In this case, the joint mode index is 2.

For example, when tu_cbf_cb is 0 and tu_cbf_cr is 1, a model for the reconstructed value (resCb) of the residual sample of the Cb component and the reconstructed value (resCr) of the residual sample of the Cr component may be determined as model 3 from among the neural network models. In this case, the joint mode index is 3.

In an embodiment of the disclosure, when a prediction type of a coding unit is an intra prediction mode, index values 1, 2, and 3 are all available for the joint mode index. For example, when the prediction type of the coding unit is the intra prediction mode, a model used for the Cb component and the Cr component may be determined according to the joint mode index.

In an embodiment of the disclosure, when the prediction type of the coding unit is an inter prediction mode, only the joint mode index of 2 may be allowed. Therefore, in a case where the prediction type of the coding unit is the inter prediction mode and the joint mode index is 2, i.e., only when tu_cbf_cb is 1 and tu_cbf_cr is 1, the joint chroma scheme may be allowed and a model for the Cb component and the Cr component may be determined as model 2.

FIG. 8 shows a table illustrating a correlation between neural network models for AI-based chroma component prediction and prediction types according to an embodiment of the disclosure. The correlation may be pre-stored in the AI-based video encoding apparatus 1500 or 1600 or the AI-based video decoding apparatus 1200 or 1300.

Referring to FIG. 8, when a prediction type is an intra prediction type, one of a scheme ([1, model1]) in which a Cb component is obtained by multiplying a joint chroma residual by weight 1 and a Cr component is obtained by applying the joint chroma residual to model 1 of a neural network, a scheme ([model2]) in which both the Cb component and the Cr component are obtained by applying the joint chroma residual to model 2 of the neural network, and a scheme ([model3, 1]) in which the Cb component is obtained by applying the joint chroma residual to model 3 of the neural network and the Cr component is obtained by multiplying the joint chroma residual by weight 1 may be used, and when the prediction type is an inter prediction type, a scheme ([1, model2]) in which a Cb component is obtained by multiplying a joint chroma residual by weight 1 and a Cr component is obtained by applying the joint chroma residual to model 2 of the neural network may be used.

Also, referring to FIG. 2 described above, a model to be used may vary according to the Cb cbf information (tu_cbf_cb) and the Cr cbf information (tu_cbf_cr).

In more detail, when the Cb cbf information (tu_cbf_cb) and the Cr cbf information (tu_cbf_cr) are obtained, a model or a weight for determining a reconstructed value (resCb) of the residual sample of the Cb component and a reconstructed value (resCr) of the residual sample of the Cr component according to the Cb cbf information and the Cr cbf information may be determined.

For example, when tu_cbf_cb is 1 and tu_cbf_cr is 0, a weight for the reconstructed value (resCb) of the residual sample of the Cb component may be determined as 1, and a model for the reconstructed value (resCr) of the residual sample of the Cr component may be determined as model 1. In this case, a joint mode index is 1.

For example, when tu_cbf_cb is 1 and tu_cbf_cr is 1, a model for the reconstructed value (resCb) of the residual sample of the Cb component and the reconstructed value (resCr) of the residual sample of the Cr component may be determined as model 2 from among the neural network models. In this case, the joint mode index is 2.

For example, when tu_cbf_cb is 0 and tu_cbf_cr is 1, a model for the reconstructed value (resCb) of the residual sample of the Cb component may be determined as model 3 from among the neural network models and a weight for the reconstructed value (resCr) of the residual sample of the Cr component may be determined as 1. In this case, the joint mode index is 3.

In an embodiment of the disclosure, when a prediction type of a coding unit is an intra prediction mode, index values 1, 2, and 3 are all available for the joint mode index. For example, when the prediction type of the coding unit is the intra prediction mode, a weight or a model used for the Cb component and the Cr component may be determined according to the joint mode index.

In an embodiment of the disclosure, when the prediction type of the coding unit is an inter prediction mode, only the joint mode index of 2 may be allowed. Therefore, in a case where the prediction type of the coding unit is the inter prediction mode and the joint mode index is 2 (e.g., only when tu_cbf_cb is 1 and tu_cbf_cr is 1), the joint chroma scheme may be allowed and a model for the Cb component and the Cr component may be determined as model 2.

Figure 9:
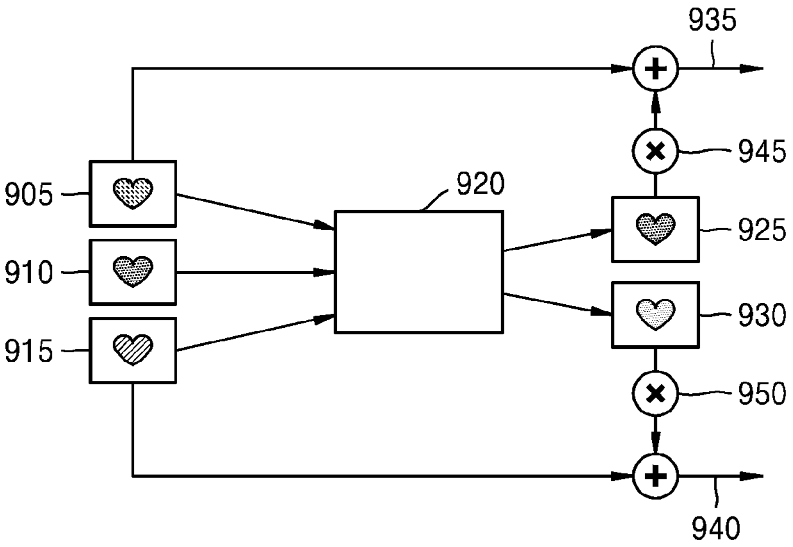
FIG. 9 illustrates a diagram for describing a neural network for AI-based chroma component prediction and a scale factor according to an embodiment of the disclosure.

FIG. 9 illustrates a diagram for describing a neural network for AI-based chroma component prediction and a scale factor according to an embodiment of the disclosure.

Referring to FIG. 9, a prediction sample 905 of a Cb component of a current block, a joint chroma residual sample 910 of the current block, and a prediction sample 915 of a Cr component of the current block are input to a neural network 920. A residual sample 925 of the Cb component and a residual sample 930 of the Cr component, which are output via the neural network 920, may be respectively multiplied by additional scale factors 945 and 950 (e.g., also referred to as the first and second scale factors 945 and 950) before the prediction sample 905 of the Cb component of the current block and the prediction sample 915 of the Cr component of the current block are added thereto.

In detail, the residual sample 925 of the Cb component output via the neural network 920 is multiplied by the first scale factor 945 and thus, is refined. Subsequently, the prediction sample 905 of the Cb component of the current block is added to the refined residual sample of the Cb component such that a reconstructed sample 935 of the Cb component of the current block may be obtained. The residual sample 930 of the Cr component output via the neural network 920 is multiplied by the second scale factor 950 and thus, is refined. Subsequently, the prediction sample 915 of the Cr component of the current block is added to the refined residual sample of the Cr component, such that a reconstructed sample 940 of the Cr component of the current block may be obtained.

Even when a trained model of a neural network is used, when a residual sample value of a Cb component or a Cr component is different from an original residual value, the residual sample needs to be refined such that a scale factor may be additionally used. An example of the scale factor will be described below with reference to FIG. 10.

Also, in the neural network of FIG. 6 described above, even when a reconstructed sample of a Cb component of a current block and a reconstructed sample of a Cr component of the current block are obtained by receiving an input of a prediction sample of the Cb component of the current block, a joint chroma residual sample of the current block, and a prediction sample of the Cr component of the current block, a scale factor may be additionally used.

According to an embodiment of the disclosure, a residual sample of the Cb component of the current block may be obtained by subtracting the prediction sample of the Cb component of the current block from the reconstructed sample of the Cb component of the current block that is one of outputs of the neural network, and a residual sample of the Cb component of the current block may be obtained by subtracting the prediction sample of the Cr component of the current block from the reconstructed sample of the Cr component of the current block that is the other one of the outputs of the neural network. A refined residual sample of the Cb component may be obtained by multiplying a first scale factor by the residual sample of the Cb component of the current block, and a refined residual sample of the Cr component may be obtained by multiplying the first scale factor by the residual sample of the Cr component of the current block. A refined reconstructed sample of the Cb component may be obtained by re-adding the prediction sample of the Cb component of the current block to the refined residual sample of the Cb component, and a refined reconstructed sample of the Cr component may be obtained by adding again the prediction sample of the Cr component of the current block to the refined residual sample of the Cr component.

As refining via scaling may be necessary for a neural network trained to immediately output a reconstructed sample, in a case of the neural network, a residual sample may be obtained by subtracting a prediction sample from a reconstructed sample and then a refined sample value may be obtained by applying a scale factor to the residual sample.

FIG. 10 shows a table illustrating a correlation between a scale factor set and a prediction type according to an embodiment of the disclosure. The correlation may be pre-stored in the AI-based video encoding apparatus 1600 or the AI-based video decoding apparatus 1300.

Referring to FIG. 10, when a prediction type is an intra prediction type, the scale factor set may include 1, ½, and ¼, and when the prediction type is an inter prediction type, the scale factor set may include 1 and ½.

For example, one of a plurality of scale factors included in a scale factor set that varies according to a prediction type may be selected and used. An index of corresponding a scaling factor value may be signaled for each block or for each slice.

According to an embodiment of the disclosure, a same scale factor may be used for a Cb component and a Cr component.

According to an embodiment of the disclosure, when a scale factor is signaled for each block or for each slice, different scale factors may be used for the Cb component and the Cr component.

The prediction type may be a prediction type of a slice or a prediction type of a coding block. That is, the scale factor set may be selected based on a slice type or selected based on a block type.

Figure 11:
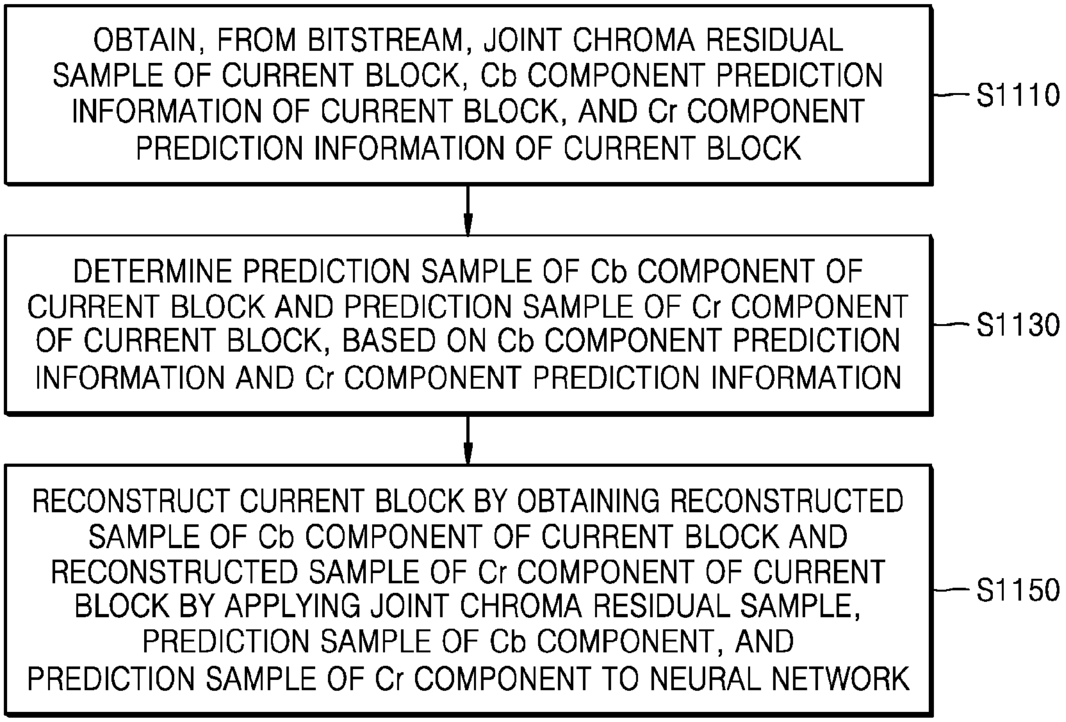
FIG. 11 illustrates a flowchart of an AI-based video decoding method according to an embodiment of the disclosure.

FIG. 11 illustrates a flowchart of an AI-based video decoding method according to an embodiment of the disclosure.

In operation S1110, the AI-based video decoding apparatus 1200 or 1300 may obtain, from a bitstream, a joint chroma residual sample of a current block, Cb component prediction information of the current block, and Cr component prediction information of the current block.

According to an embodiment of the disclosure, the joint chroma residual sample of the current block may be a mean value between an actual value of a residual sample of a Cb component of the current block and an actual value of a residual sample of a Cr component of the current block.

According to an embodiment of the disclosure, the joint chroma residual sample of the current block may be equal to the actual value of the residual sample of the Cb component of the current block.

According to an embodiment of the disclosure, the joint chroma residual sample of the current block may be equal to the actual value of the residual sample of the Cr component of the current block.

According to an embodiment of the disclosure, the joint chroma residual sample of the current block may be determined by an encoder by performing a sum of transform difference (SATD) or rate distortion optimization (RDO) calculation and may be transmitted in the bitstream.

In S1130, the AI-based video decoding apparatus 1200 or 1300 may determine a prediction sample of the Cb component of the current block and a prediction sample of the Cr component of the current block, based on the Cb component prediction information and the Cr component prediction information. For example, the prediction sample of the Cb component may be determined based on at least Cb component prediction information obtained from a bitstream, and the prediction sample of the Cr component of the current block may be determined based on at least Cr component prediction information obtained from the bitstream.

In S1150, the AI-based video decoding apparatus 1200 or 1300 may reconstruct the current block by obtaining a reconstructed sample of the Cb component of the current block and a reconstructed sample of the Cr component of the current block by applying the joint chroma residual sample, the prediction sample of the Cb component, and the prediction sample of the Cr component to a neural network.

According to an embodiment of the disclosure, the AI-based video decoding apparatus 1300 may obtain at least one of the residual sample of the Cb component of the current block or the residual sample of the Cr component of the current block by applying the joint chroma residual sample, the prediction sample of the Cb component, and the prediction sample of the Cr component to the neural network. The AI-based video decoding apparatus 1300 may reconstruct the current block by obtaining the reconstructed sample of the Cb component and the reconstructed sample of the Cr component by using at least one of the residual sample of the Cb component or the residual sample of the Cr component, the prediction sample of the Cb component, and the prediction sample of the Cr component.

According to an embodiment of the disclosure, the AI-based video decoding apparatus 1300 may refine the residual sample of the Cb component by applying a first scale factor to the residual sample of the Cb component obtained via the network, and may refine the residual sample of the Cr component by applying a second scale factor to the residual sample of the Cr component.

According to an embodiment of the disclosure, the first scale factor and the second scale factor may be determined according to a scale factor value that is indicated by an index obtained from the bitstream and is included in a scale factor set.

According to an embodiment of the disclosure, the scale factor set may be determined according to at least one of a type of a slice including the current block or a type of the current block, from among a plurality of scale factor sets.

According to an embodiment of the disclosure, the plurality of scale factor sets may include [1, ½, ¼] and [1, ½].

According to an embodiment of the disclosure, the neural network may be trained to determine a correlation between Cb and Cr for each sample of a current block for training by receiving an input value of a joint chroma residual sample for training, a prediction sample of a Cb component for training, and a prediction sample of a Cr component for training.

According to an embodiment of the disclosure, for the correlation between Cb and Cr, weights may be respectively determined for the residual sample of the Cb component and the residual sample of the Cr component.

According to an embodiment of the disclosure, the input value of the neural network may further include at least one of a quantization step size of the current block, a quantization error of the current block, or a block obtained by downsampling a reconstructed luma block based on a chroma format, the reconstructed luma block corresponding to a current chroma block of the current block.

According to an embodiment of the disclosure, the neural network may be trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

According to an embodiment of the disclosure, a model of the neural network may be determined based on Cb cbf information indicating whether a transformation coefficient level of the current block with respect to a Cb component includes a non-zero Cb component, and Cr cbf information indicating whether a transformation coefficient level of the current block with respect to a Cr component includes a non-zero Cr component, the Cb cbf information and the Cr cbf information being obtained from the bitstream.

According to an embodiment of the disclosure, the model of the neural network may be determined according to at least one of a type of the current block, a type of a slice including the current block, a QP range of the slice, or whether it is a Cb component or a Cr component of the current block.

Figure 12:
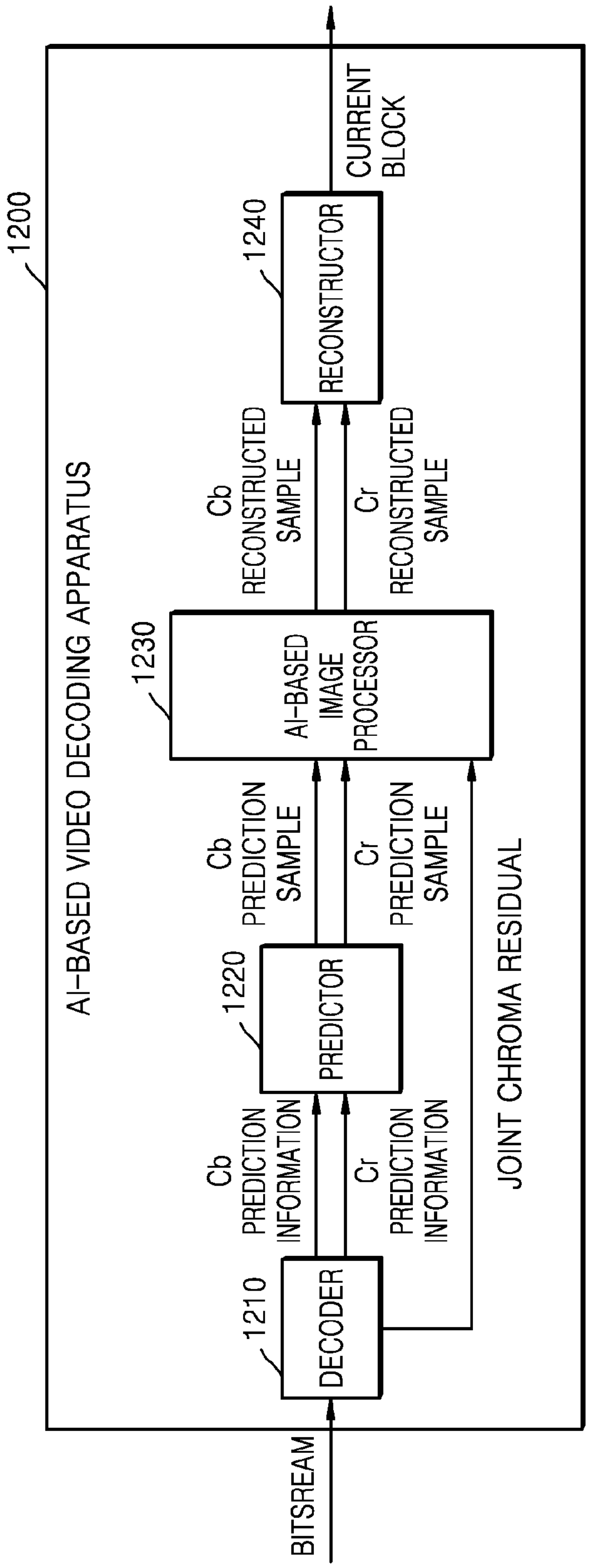
FIG. 12 illustrates a block diagram of a configuration of an AI-based video decoding apparatus according to an embodiment of the disclosure.

FIG. 12 illustrates a block diagram of a configuration of an AI-based video decoding apparatus according an embodiment of the disclosure.

Referring to FIG. 12, the AI-based video decoding apparatus 1200 may include a decoder 1210, a predictor 1220, an AI-based image processor 1230, and a reconstructor 1240.

The decoder 1210, the predictor 1220, the AI-based image processor 1230, and the reconstructor 1240 may be implemented via one or more processors. The decoder 1210, the predictor 1220, the AI-based image processor 1230, and the reconstructor 1240 may operate according to instructions stored in a memory, where the instructions cause the one or more processors to perform one or more operations.

While FIG. 12 separately illustrates the decoder 1210, the predictor 1220, the AI-based image processor 1230, and the reconstructor 1240, the decoder 1210, the predictor 1220, the AI-based image processor 1230, and the reconstructor 1240 may be implemented via one processor. For example, the decoder 1210, the predictor 1220, the AI-based image processor 1230, and the reconstructor 1240 may be implemented via a dedicated processor or may be implemented via a combination of a general-purpose processor such as an application processor (AP), a central processing unit (CPU) or a graphics processing unit (GPU) and software. Also, the dedicated processor may include a memory including instructions for implementing an embodiment of the disclosure or may include a memory processor configured to use an external memory.

The decoder 1210, the predictor 1220, the AI-based image processor 1230, and the reconstructor 1240 may be configured via a plurality of processors. In this case, they may be implemented via a combination of dedicated processors, or may be implemented via a combination of a plurality of general-use processors such as APs, CPUs, or GPUs and software. Also, a processor may include an AI-dedicated processor. As another example, an AI-dedicated processor may be configured as a chip separate from the processor.

The decoder 1210 may obtain, from a bitstream, a joint chroma residual sample of a current block, Cb component prediction information of the current block, and Cr component prediction information of the current block.

According to an embodiment of the disclosure, the joint chroma residual sample of the current block may be a mean value between an actual value of a residual sample of a Cb component of the current block and an actual value of a residual sample of a Cr component of the current block.

According to an embodiment of the disclosure, the joint chroma residual sample of the current block may be equal to the actual value of the residual sample of the Cb component of the current block.

According to an embodiment of the disclosure, the joint chroma residual sample of the current block may be equal to the actual value of the residual sample of the Cr component of the current block.

According to an embodiment of the disclosure, the joint chroma residual sample of the current block may be determined by an encoder by performing a SATD or RDO calculation and may be transmitted in the bitstream.

In an embodiment of the disclosure, the decoder 1210 transmits the Cb component prediction information of the current block and the Cr component prediction information of the current block to the predictor 1220.

The predictor 1220 may determine a prediction sample of the Cb component of the current block and a prediction sample of the Cr component of the current block based on the Cb component prediction information and the Cr component prediction information.

According to an embodiment of the disclosure, the AI-based image processor 1230 may include the neural network 520 described with reference to FIG. 5 or the neural network 620 described with reference to FIG. 6.

According to an embodiment of the disclosure, a neural network included in the AI-based image processor 1230 may be trained to determine a correlation between Cb and Cr for each sample of a current block for training by receiving an input value of a joint chroma residual sample for training, a prediction sample of a Cb component for training, and a prediction sample of a Cr component for training.

According to an embodiment of the disclosure, for the correlation between Cb and Cr, weights may be respectively determined for the residual sample of the Cb component and the residual sample of the Cr component.

According to an embodiment of the disclosure, the neural network may be trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

The AI-based image processor 1230 may obtain a reconstructed sample of the Cb component and a reconstructed sample of the Cr component by receiving an input of a joint chroma residual sample, the prediction sample of the Cb component and the prediction sample of the Cr component.

According to an embodiment of the disclosure, the input value of the neural network may further include at least one of a quantization step size of the current block, a quantization error of the current block, or a block obtained by downsampling a reconstructed luma block based on a chroma format, the reconstructed luma block corresponding to a current chroma block of the current block.

According to an embodiment of the disclosure, the AI-based image processor 1230 may obtain the reconstructed sample of the Cb component and the reconstructed sample of the Cr component by additionally receiving an input of at least one of the quantization step size of the current block, the quantization error of the current block, or the block obtained by downsampling the reconstructed luma block based on the chroma format, the reconstructed luma block corresponding to the current chroma block of the current block.

According to an embodiment of the disclosure, the decoder 1210 may additionally obtain, from the bitstream, Cb cbf information indicating whether a transformation coefficient level of the current block with respect to a Cb component includes a non-zero Cb component, and Cr cbf information indicating whether a transformation coefficient level of the current block with respect to a Cr component includes a non-zero Cr component. A model of the neural network included in the AI-based image processor 1230 may be determined based on the Cb cbf information and the Cr cbf information.

According to an embodiment of the disclosure, the model of the neural network included in the AI-based image processor 1230 may be determined according to at least one of a type of the current block, a type of a slice including the current block, a QP range of the slice, or whether it is a Cb component or a Cr component of the current block.

The reconstructor 1240 may reconstruct the current block by using the reconstructed sample of the Cb component and the reconstructed sample of the Cr component which are obtained by the AI-based image processor 1230.

An output of a neural network included in the AI-based image processor 1230 may not be the reconstructed sample of the Cb component and the reconstructed sample of the Cr component, but instead, may be one of the residual sample of the Cb component and the residual sample of the Cr component. In this case, an adder may be additionally included to add the residual sample of the Cb component and the residual sample of the Cr component to the prediction sample of the Cb component and the prediction sample of the Cr component. This will now be described with reference to an AI-based video decoding apparatus of FIG. 13.

Figure 13:
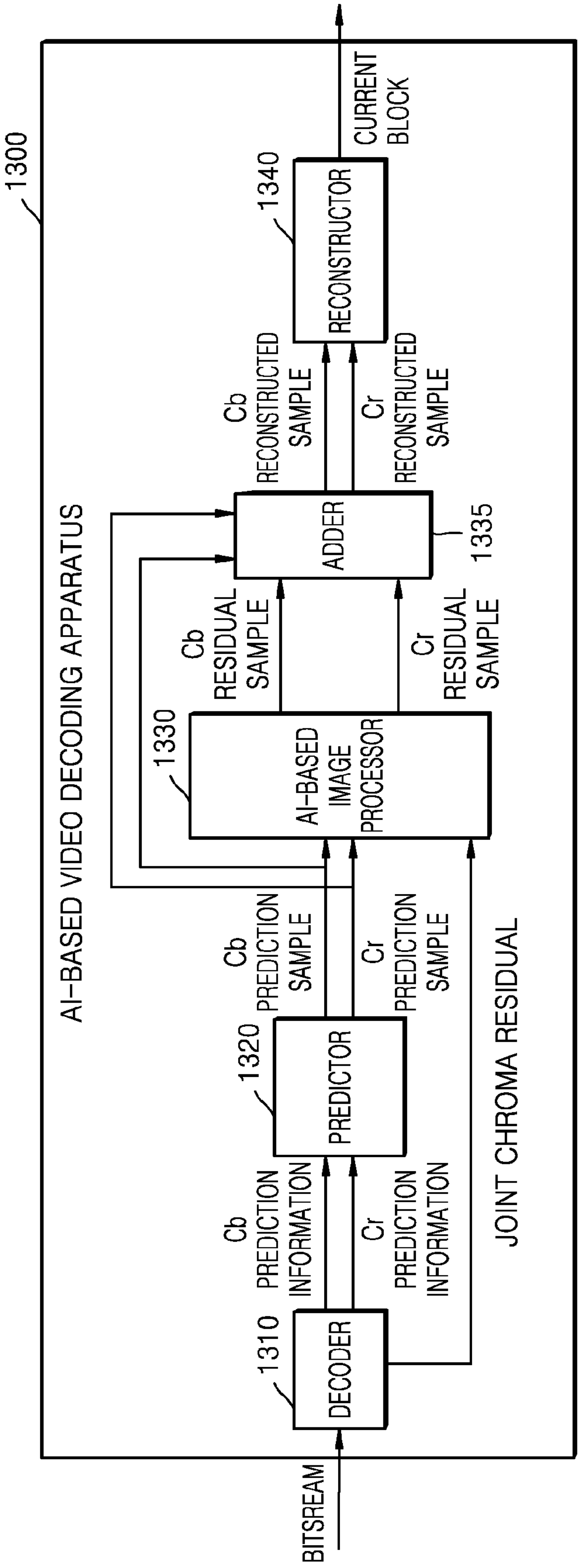
FIG. 13 illustrates a block diagram of a configuration of an AI-based video decoding apparatus according to an embodiment of the disclosure.

FIG. 13 illustrates a block diagram of a configuration of an AI-based video decoding apparatus according to an embodiment of the disclosure.

Referring to FIG. 13, the AI-based video decoding apparatus 1300 may include a decoder 1310, a predictor 1320, an AI-based image processor 1330, an adder 1335, and a reconstructor 1340.

The decoder 1310, the predictor 1320, the AI-based image processor 1330, the adder 1335, and the reconstructor 1340 may be implemented via one or more processors. The decoder 1310, the predictor 1320, the AI-based image processor 1330, the adder 1335, and the reconstructor 1340 may operate according to instructions stored in a memory.

While FIG. 13 separately illustrates the decoder 1310, the predictor 1320, the AI-based image processor 1330, the adder 1335, and the reconstructor 1340, the decoder 1310, the predictor 1320, the AI-based image processor 1330, the adder 1335, and the reconstructor 1340 may be implemented via one processor. In this case, the decoder 1310, the predictor 1320, the AI-based image processor 1330, the adder 1335, and the reconstructor 1340 may be implemented via a dedicated processor or may be implemented via a combination of a general-purpose processor such as an AP, a CPU or a GPU and software. Also, the dedicated processor may include a memory including instructions for implementing an embodiment of the disclosure or may include a memory processor configured to use an external memory.

The decoder 1310, the predictor 1320, the AI-based image processor 1330, the adder 1335, and the reconstructor 1340 may be configured via a plurality of processors. In this case, they may be implemented via a combination of dedicated processors, or may be implemented via a combination of a plurality of general-use processors such as APs, CPUs, or GPUs and software. Also, a processor may include an AI-dedicated processor. As another example, an AI-dedicated processor may be configured as a chip separate from the processor.

The decoder 1310 may obtain, from a bitstream, a joint chroma residual sample of a current block, Cb component prediction information of the current block, and Cr component prediction information of the current block.

According to an embodiment of the disclosure, the joint chroma residual sample of the current block may be a mean value between an actual value of a residual sample of a Cb component of the current block and an actual value of a residual sample of a Cr component of the current block.

According to an embodiment of the disclosure, the joint chroma residual sample of the current block may be equal to the actual value of the residual sample of the Cb component of the current block.

According to an embodiment of the disclosure, the joint chroma residual sample of the current block may be equal to the actual value of the residual sample of the Cr component of the current block.

According to an embodiment of the disclosure, the joint chroma residual sample of the current block may be determined by an encoder by performing a SATD or RDO calculation and may be transmitted in the bitstream.

The decoder 1310 transmits the Cb component prediction information of the current block and the Cr component prediction information of the current block to the predictor 1320.

The predictor 1320 may determine a prediction sample of the Cb component of the current block and a prediction sample of the Cr component of the current block, based on the Cb component prediction information and the Cr component prediction information.

The AI-based image processor 1330 may include the neural network 520 described with reference to FIG. 5.

According to an embodiment of the disclosure, a neural network included in the AI-based image processor 1330 may be trained to determine a correlation between Cb and Cr for each sample of a current block for training by receiving an input value of a joint chroma residual sample for training, a prediction sample of a Cb component for training, and a prediction sample of a Cr component for training.

According to an embodiment of the disclosure, for the correlation between Cb and Cr, weights may be respectively determined for the residual sample of the Cb component and the residual sample of the Cr component.

According to an embodiment of the disclosure, the neural network may be trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

The AI-based image processor 1330 may obtain at least one of a residual sample of the Cb component of the current block or a residual sample of the Cr component of the current block by receiving an input of a joint chroma residual sample, the prediction sample of the Cb component and the prediction sample of the Cr component.

According to an embodiment of the disclosure, the input value of the neural network may further include at least one of a quantization step size of the current block, a quantization error of the current block, or a block obtained by downsampling a reconstructed luma block based on a chroma format, the reconstructed luma block corresponding to a current chroma block of the current block.

According to an embodiment of the disclosure, the AI-based image processor 1330 may obtain at least one of the residual sample of the Cb component or the residual sample of the Cr component by additionally receiving an input of at least one of the quantization step size of the current block, the quantization error of the current block, or the block obtained by downsampling the reconstructed luma block based on the chroma format, the reconstructed luma block corresponding to the current chroma block of the current block.

The adder 1335 may obtain a reconstructed sample of the Cb component and a reconstructed sample of the Cr component by using at least one of the residual sample of the Cb component or the residual sample of the Cr component, the prediction sample of the Cb component, and the prediction sample of the Cr component. For example, the adder 1335 may obtain the reconstructed sample of the Cb component by adding the residual sample of the Cb component to the prediction sample of the Cb component, and may obtain the reconstructed sample of the Cr component by adding the residual sample of the Cr component to the prediction sample of the Cr component.

According to an embodiment of the disclosure, the decoder 1310 may additionally obtain, from the bitstream, an index indicating a scale factor. The AI-based image processor 1330 may additionally obtain, from the decoder 1310, an index indicating a scale factor included in a scale factor set. The AI-based image processor 1330 may apply obtained scale factors respectively to the residual sample of the Cb component of the current block and the residual sample of the Cr component of the current block, thereby obtaining a refined residual sample of the Cb component of the current block and a refined residual sample of the Cr component of the current block. In detail, the AI-based image processor 1330 may refine the residual sample of the Cb component by applying a first scale factor to the residual sample of the Cb component, and may refine the residual sample of the Cr component by applying a second scale factor to the residual sample of the Cr component. The adder 1335 may obtain the reconstructed sample of the Cb component by adding the refined residual sample of the Cb component to the prediction sample of the Cb component, and may obtain the reconstructed sample of the Cr component by adding the refined residual sample of the Cr component to the prediction sample of the Cr component.

According to an embodiment of the disclosure, the scale factor set may be determined according to at least one of a type of a slice including the current block or a type of the current block, from among a plurality of scale factor sets.

According to an embodiment of the disclosure, the plurality of scale factor sets may include [1, ½, ¼] and [1, ½].

According to an embodiment of the disclosure, the decoder 1310 may additionally obtain, from the bitstream, Cb cbf information indicating whether a transformation coefficient level of the current block with respect to a Cb component includes a non-zero Cb component, and Cr cbf information indicating whether a transformation coefficient level of the current block with respect to a Cr component includes a non-zero Cr component. A model of the neural network included in the AI-based image processor 1330 may be determined based on the Cb cbf information and the Cr cbf information.

According to an embodiment of the disclosure, the model of the neural network included in the AI-based image processor 1330 may be determined according to at least one of a type of the current block, a type of a slice including the current block, a QP range of the slice, or whether it is a Cb component or a Cr component of the current block.

The reconstructor 1340 may reconstruct the current block by using the reconstructed sample of the Cb component and the reconstructed sample of the Cr component which are obtained by the adder 1335.

Figure 14:
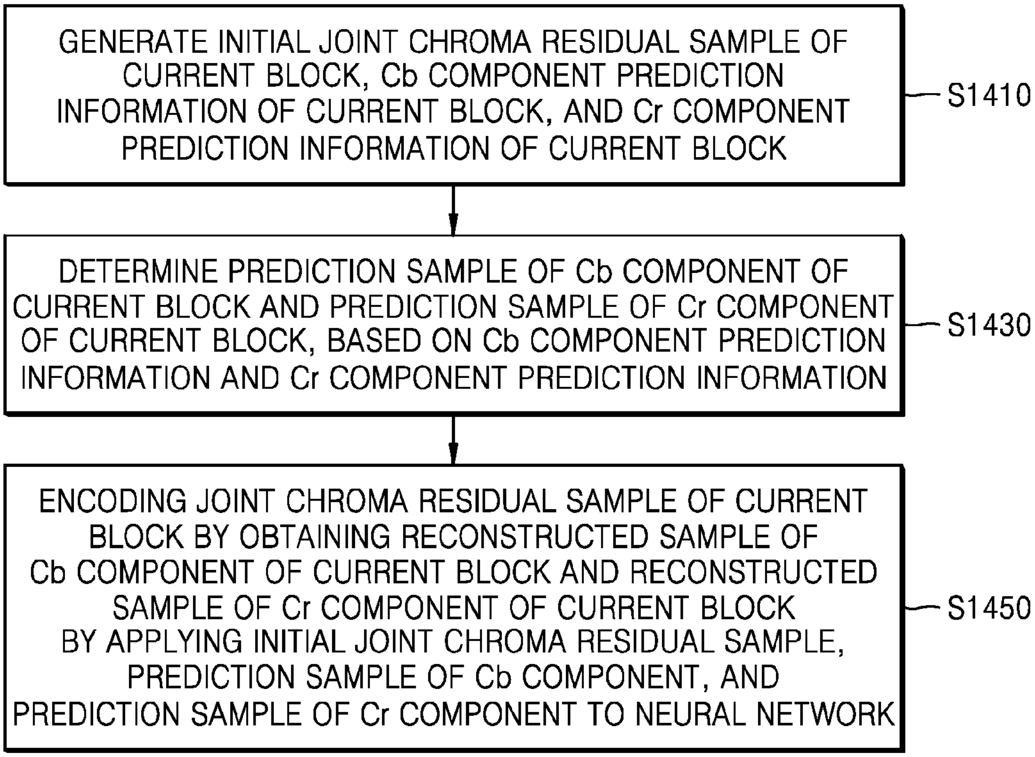
FIG. 14 illustrates a flowchart of an AI-based video encoding method according to an embodiment of the disclosure.

FIG. 14 illustrates a flowchart of an AI-based video encoding method according to an embodiment of the disclosure.

In operation S1410, the AI-based video encoding apparatus 1500 or 1600 may generate an initial joint chroma residual sample of a current block, Cb component prediction information of the current block, and Cr component prediction information of the current block.

According to an embodiment of the disclosure, the initial joint chroma residual sample of the current block may be a mean value between an actual value of a residual sample of a Cb component of the current block and an actual value of a residual sample of a Cr component of the current block.

According to an embodiment of the disclosure, the initial joint chroma residual sample of the current block may be equal to the actual value of the residual sample of the Cb component of the current block.

According to an embodiment of the disclosure, the initial joint chroma residual sample of the current block may be equal to the actual value of the residual sample of the Cr component of the current block.

In operation S1430, the AI-based video encoding apparatus 1500 or 1600 may determine a prediction sample of the Cb component of the current block and a prediction sample of the Cr component of the current block, based on the Cb component prediction information and the Cr component prediction information. For example, the prediction sample of the Cb component may be determined based on at least Cb component prediction information obtained from a bitstream, and the prediction sample of the Cr component of the current block may be determined based on at least Cr component prediction information obtained from the bitstream.

In S1450, the AI-based video encoding apparatus 1500 or 1600 may encode a joint chroma residual sample of the current block by obtaining a reconstructed sample of the Cb component of the current block and a reconstructed sample of the Cr component of the current block by applying the initial joint chroma residual sample, the prediction sample of the Cb component, and the prediction sample of the Cr component to a neural network.

In S1450, the AI-based video encoding apparatus 1500 or 1600 may obtain at least one of the residual sample of the Cb component of the current block or the residual sample of the Cr component of the current block by applying, to the neural network, the initial joint chroma residual sample, the prediction sample of the Cb component, and the prediction sample of the Cr component. The AI-based video encoding apparatus 1600 may encode the joint chroma residual sample of the current block by obtaining the reconstructed sample of the Cb component and the reconstructed sample of the Cr component by using at least one of the residual sample of the Cb component or the residual sample of the Cr component, the prediction sample of the Cb component, and the prediction sample of the Cr component.

According to an embodiment of the disclosure, the joint chroma residual sample of the current block may be determined by performing a SATD or RDO calculation and may be encoded.

According to an embodiment of the disclosure, the Cb component prediction information and the Cr component prediction information of the current block may be additionally encoded.

According to an embodiment of the disclosure, the AI-based video encoding apparatus 1600 may refine the residual sample of the Cb component by applying a first scale factor to the residual sample of the Cb component obtained via the network, and may refine the residual sample of the Cr component by applying a second scale factor to the residual sample of the Cr component.

According to an embodiment of the disclosure, the first scale factor and the second scale factor may be encoded as an index indicating a scale factor value included in a scale factor set. That is, the index indicating the scale factor value may be determined by performing a SATD or RDO calculation, and may be signaled by being included in the bitstream.

According to an embodiment of the disclosure, the scale factor set may be determined according to at least one of a type of a slice including the current block or a type of the current block, from among a plurality of scale factor sets.

According to an embodiment of the disclosure, the plurality of scale factor sets may include [1, ½, ¼] and [1, ½].

According to an embodiment of the disclosure, the neural network may be trained to determine a correlation between Cb and Cr for each sample of a current block for training by receiving an input value of a joint chroma residual sample for training, a prediction sample of a Cb component for training, and a prediction sample of a Cr component for training.

According to an embodiment of the disclosure, for the correlation between Cb and Cr, weights may be respectively determined for the residual sample of the Cb component and the residual sample of the Cr component.

According to an embodiment of the disclosure, the input value of the neural network may further include at least one of a quantization step size of the current block, a quantization error of the current block, or a block obtained by downsampling a reconstructed luma block based on a chroma format, the reconstructed luma block corresponding to a current chroma block of the current block.

According to an embodiment of the disclosure, the neural network may be trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

According to an embodiment of the disclosure, a model of the neural network may be determined based on Cb cbf information indicating whether a transformation coefficient level of the current block with respect to a Cb component includes a non-zero Cb component, and Cr cbf information indicating whether a transformation coefficient level of the current block with respect to a Cr component includes a non-zero Cr component, the Cb cbf information and the Cr cbf information being obtained from the bitstream.

According to an embodiment of the disclosure, the model of the neural network may be determined according to at least one of a type of the current block, a type of a slice including the current block, a QP range of the slice, or whether it is a Cb component or a Cr component of the current block.

Figure 15:
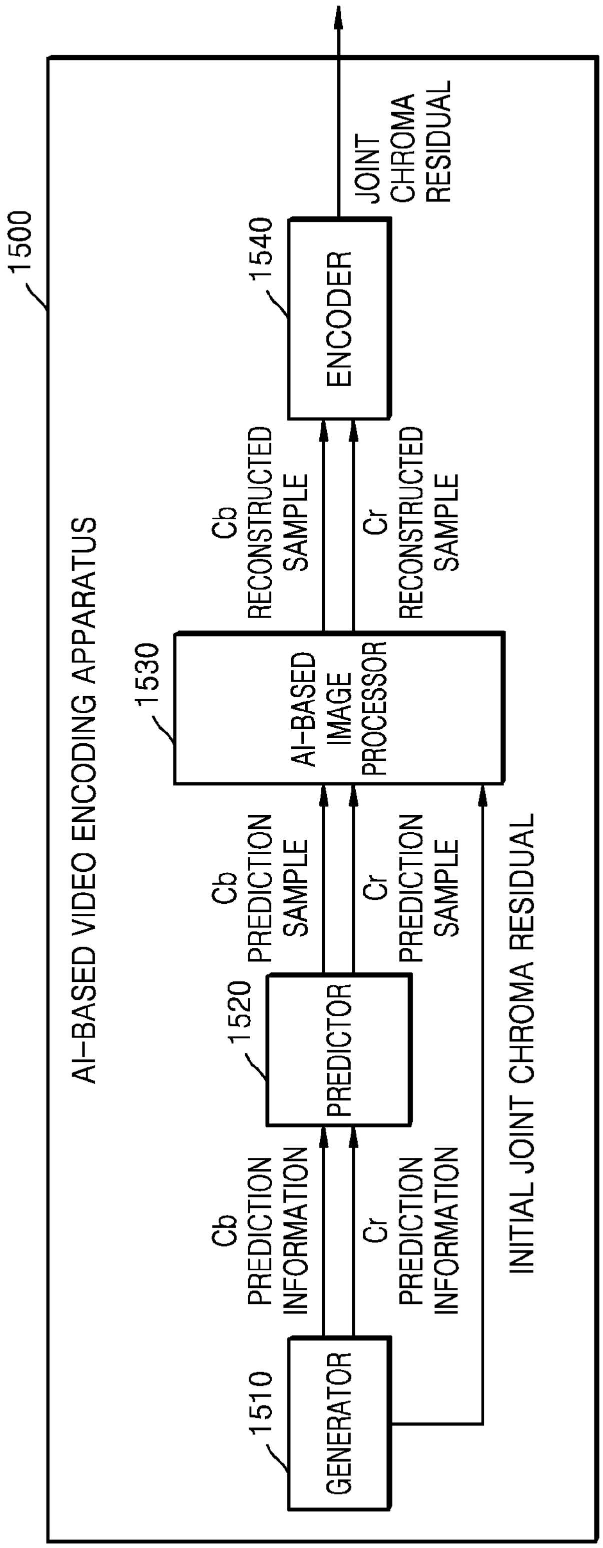
FIG. 15 illustrates a block diagram of a configuration of an AI-based video encoding apparatus according to an embodiment of the disclosure.

FIG. 15 illustrates a block diagram of a configuration of an AI-based video encoding apparatus according to an embodiment of the disclosure.

Referring to FIG. 15, the AI-based video encoding apparatus 1500 may include a generator 1510, a predictor 1520, an AI-based image processor 1530, and an encoder 1540.

The generator 1510, the predictor 1520, the AI-based image processor 1530, and the encoder 1540 may be implemented via one or more processors. The generator 1510, the predictor 1520, the AI-based image processor 1530, and the encoder 1540 may operate according to instructions stored in a memory.

While FIG. 15 separately illustrates the generator 1510, the predictor 1520, the AI-based image processor 1530, and the encoder 1540, the generator 1510, the predictor 1520, the AI-based image processor 1530, and the encoder 1540 may be implemented via one processor. In this case, the generator

1510, the predictor 1520, the AI-based image processor 1530, and the encoder 1540 may be implemented via a dedicated processor or may be implemented via a combination of a general-purpose processor such as an AP, a CPU or a GPU and software. Also, the dedicated processor may include a memory including instructions for implementing an embodiment of the disclosure or may include a memory processor configured to use an external memory.

The generator 1510, the predictor 1520, the AI-based image processor 1530, and the encoder 1540 may be configured via a plurality of processors. In this case, they may be implemented via a combination of dedicated processors, or may be implemented via a combination of a plurality of general-use processors such as APs, CPUs, or GPUs and software. Also, a processor may include an AI-dedicated processor. As another example, an AI-dedicated processor may be configured as a chip separate from the processor.

The generator 1510 may generate an initial joint chroma residual sample of a current block, Cb component prediction information of the current block, and Cr component prediction information of the current block.

According to an embodiment of the disclosure, the initial joint chroma residual sample of the current block may be a mean value between an actual value of a residual sample of a Cb component of the current block and an actual value of a residual sample of a Cr component of the current block.

According to an embodiment of the disclosure, the initial joint chroma residual sample of the current block may be equal to the actual value of the residual sample of the Cb component of the current block.

According to an embodiment of the disclosure, the initial joint chroma residual sample of the current block may be equal to the actual value of the residual sample of the Cr component of the current block.

The generator 1510 transmits the Cb component prediction information of the current block, and the Cr component prediction information of the current block to the predictor 1520.

The predictor 1520 may determine a prediction sample of the Cb component of the current block and a prediction sample of the Cr component of the current block, based on the Cb component prediction information and the Cr component prediction information.

According to an embodiment of the disclosure, the AI-based image processor 1530 may include the neural network 520 described with reference to FIG. 5 or the neural network 620 described with reference to FIG. 6.

According to an embodiment of the disclosure, a neural network included in the AI-based image processor 1530 may be trained to determine a correlation between Cb and Cr for each sample of a current block for training by receiving an input value of a joint chroma residual sample for training, a prediction sample of a Cb component for training, and a prediction sample of a Cr component for training.

According to an embodiment of the disclosure, for the correlation between Cb and Cr, weights may be respectively determined for the residual sample of the Cb component and the residual sample of the Cr component.

According to an embodiment of the disclosure, the neural network may be trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

The AI-based image processor 1530 may obtain a reconstructed sample of the Cb component and a reconstructed sample of the Cr component by receiving an input of the initial joint chroma residual sample, the prediction sample of the Cb component and the prediction sample of the Cr component.

According to an embodiment of the disclosure, the input value of the neural network may further include at least one of a quantization step size of the current block, a quantization error of the current block, or a block obtained by downsampling a reconstructed luma block based on a chroma format, the reconstructed luma block corresponding to a current chroma block of the current block.

According to an embodiment of the disclosure, the AI-based image processor 1530 may obtain the reconstructed sample of the Cb component and the reconstructed sample of the Cr component by additionally receiving an input of at least one of the quantization step size of the current block, the quantization error of the current block, or the block obtained by downsampling the reconstructed luma block based on the chroma format, the reconstructed luma block corresponding to the current chroma block of the current block.

According to an embodiment of the disclosure, the generator 1510 may additionally generate Cb cbf information indicating whether a transformation coefficient level of the current block with respect to a Cb component includes a non-zero Cb component, and Cr cbf information indicating whether a transformation coefficient level of the current block with respect to a Cr component includes a non-zero Cr component. A model of the neural network included in the AI-based image processor 1530 may be determined based on the Cb cbf information and the Cr cbf information.

According to an embodiment of the disclosure, the model of the neural network included in the AI-based image processor 1530 may be determined according to at least one of a type of the current block, a type of a slice including the current block, a QP range of the slice, or whether it is a Cb component or a Cr component of the current block.

The encoder 1540 may encode a joint chroma residual sample of the current block by using the reconstructed sample of the Cb component and the reconstructed sample of the Cr component which are obtained by the AI-based image processor 1530.

According to an embodiment of the disclosure, the joint chroma residual sample of the current block may be determined by performing a SATD or RDO calculation and may be encoded.

According to an embodiment of the disclosure, the encoder 1540 may additionally encode the Cb component prediction information and the Cr component prediction information of the current block which are obtained by the generator 1510.

An output of a neural network included in the AI-based image processor 1530 may not be the reconstructed sample of the Cb component and the reconstructed sample of the Cr component but may be one of the residual sample of the Cb component and the residual sample of the Cr component. In this case, an adder may be additionally included to add the residual sample of the Cb component and the residual sample of the Cr component to the prediction sample of the Cb component and the prediction sample of the Cr component. This will now be described with reference to an AI-based video encoding apparatus of FIG. 16.

Figure 16:
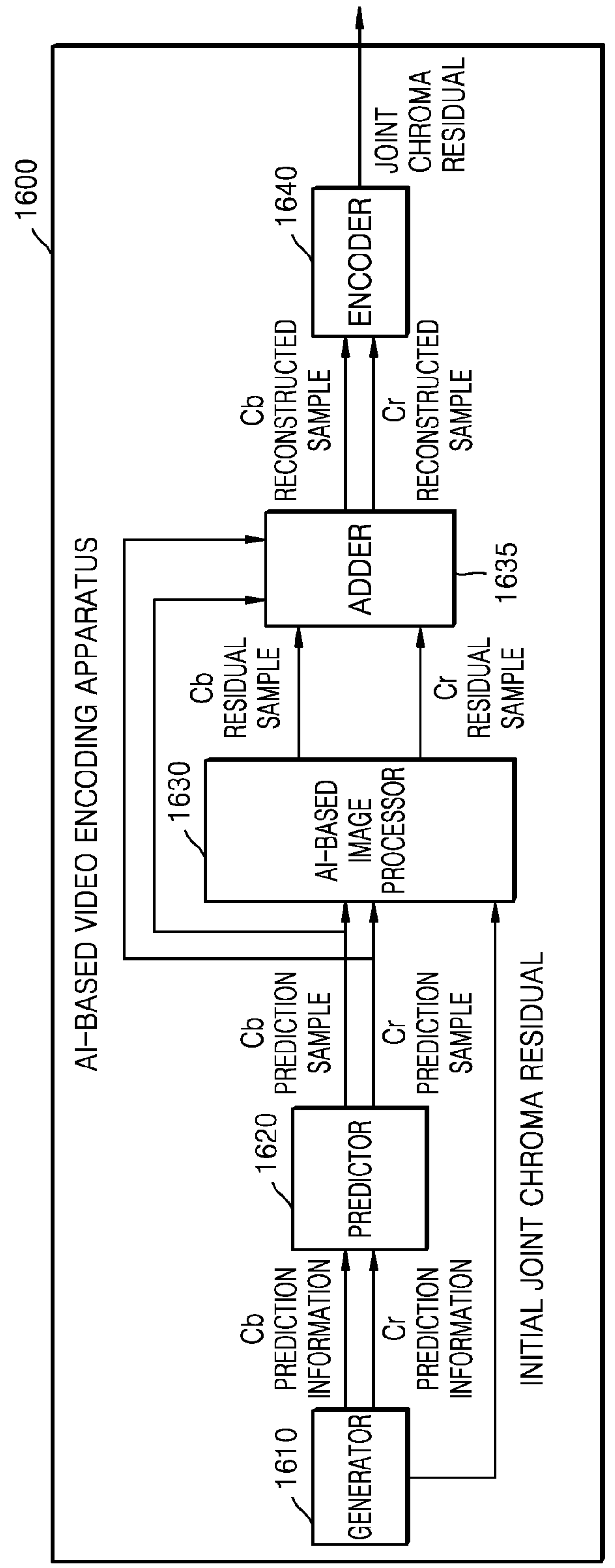
FIG. 16 illustrates a block diagram of a configuration of an AI-based video encoding apparatus according to an embodiment of the disclosure.

FIG. 16 illustrates a block diagram of a configuration of an AI-based video encoding apparatus according to an embodiment of the disclosure.

Referring to FIG. 16, the AI-based video encoding apparatus 1600 may include a generator 1610, a predictor 1620, an AI-based image processor 1630, an adder 1635, and an encoder 1640.

The generator 1610, the predictor 1620, the AI-based image processor 1630, the adder 1635, and the encoder 1640 may be implemented via one or more processors. The generator 1610, the predictor 1620, the AI-based image processor 1630, the adder 1635, and the encoder 1640 may operate according to instructions stored in a memory.

While FIG. 16 separately illustrates the generator 1610, the predictor 1620, the AI-based image processor 1630, the adder 1635, and the encoder 1640, the generator 1610, the predictor 1620, the AI-based image processor 1630, the adder 1635, and the encoder 1640 may be implemented via one processor. In this case, the generator 1610, the predictor 1620, the AI-based image processor 1630, the adder 1635, and the encoder 1640 may be implemented via a dedicated processor or may be implemented via a combination of a general-purpose processor such as an AP, a CPU or a GPU and software. Also, the dedicated processor may include a memory including instructions for implementing an embodiment of the disclosure or may include a memory processor configured to use an external memory.

The generator 1610, the predictor 1620, the AI-based image processor 1630, the adder 1635, and the encoder 1640 may be configured via a plurality of processors. In this case, they may be implemented via a combination of dedicated processors, or may be implemented via a combination of a plurality of general-use processors such as APs, CPUs, or GPUs and software. Also, a processor may include an AI-dedicated processor. As another example, an AI-dedicated processor may be configured as a chip separate from the processor.

The generator 1610 may generate an initial joint chroma residual sample of a current block, Cb component prediction information of the current block, and Cr component prediction information of the current block.

According to an embodiment of the disclosure, the initial joint chroma residual sample of the current block may be a mean value between an actual value of a residual sample of a Cb component of the current block and an actual value of a residual sample of a Cr component of the current block.

According to an embodiment of the disclosure, the initial joint chroma residual sample of the current block may be equal to the actual value of the residual sample of the Cb component of the current block.

According to an embodiment of the disclosure, the initial joint chroma residual sample of the current block may be equal to the actual value of the residual sample of the Cr component of the current block.

The generator 1610 transmits the Cb component prediction information of the current block, and the Cr component prediction information of the current block to the predictor 1620.

The predictor 1620 may determine a prediction sample of the Cb component of the current block and a prediction sample of the Cr component of the current block, based on the Cb component prediction information and the Cr component prediction information.

According to an embodiment of the disclosure, the AI-based image processor 1630 may include the neural network 520 described with reference to FIG. 5.

According to an embodiment of the disclosure, a neural network included in the AI-based image processor 1630 may be trained to determine a correlation between Cb and Cr for each sample of a current block for training by receiving an input value of a joint chroma residual sample for training, a prediction sample of a Cb component for training, and a prediction sample of a Cr component for training.

According to an embodiment of the disclosure, for the correlation between Cb and Cr, weights may be respectively determined for the residual sample of the Cb component and the residual sample of the Cr component.

According to an embodiment of the disclosure, the neural network may be trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

The AI-based image processor 1630 may obtain at least one of the residual sample of the Cb component of the current block or the residual sample of the Cr component of the current block by receiving an input of the initial joint chroma residual sample, the prediction sample of the Cb component, and the prediction sample of the Cr component.

According to an embodiment of the disclosure, the input value of the neural network may further include at least one of a quantization step size of the current block, a quantization error of the current block, or a block obtained by downsampling a reconstructed luma block based on a chroma format, the reconstructed luma block corresponding to a current chroma block of the current block.

According to an embodiment of the disclosure, the AI-based image processor 1630 may obtain at least one of the residual sample of the Cb component or the residual sample of the Cr component by additionally receiving an input of at least one of the quantization step size of the current block, the quantization error of the current block, or the block obtained by downsampling the reconstructed luma block based on the chroma format, the reconstructed luma block corresponding to the current chroma block of the current block.

According to an embodiment of the disclosure, the generator 1610 may additionally generate Cb cbf information indicating whether a transformation coefficient level of the current block with respect to a Cb component includes a non-zero Cb component, and Cr cbf information indicating whether a transformation coefficient level of the current block with respect to a Cr component includes a non-zero Cr component. A model of the neural network included in the AI-based image processor 1630 may be determined based on the Cb cbf information and the Cr cbf information.

According to an embodiment of the disclosure, the model of the neural network included in the AI-based image processor 1630 may be determined according to at least one of a type of the current block, a type of a slice including the current block, a QP range of the slice, or whether it is a Cb component or a Cr component of the current block.

The adder 1635 may obtain a reconstructed sample of the Cb component and a reconstructed sample of the Cr component by using at least one of the residual sample of the Cb component or the residual sample of the Cr component, the prediction sample of the Cb component, and the prediction sample of the Cr component. For example, the adder 1635 may obtain the reconstructed sample of the Cb component by adding the residual sample of the Cb component to the prediction sample of the Cb component, and may obtain the reconstructed sample of the Cr component by adding the residual sample of the Cr component to the prediction sample of the Cr component.

The encoder 1640 may encode a joint chroma residual sample of the current block by using the reconstructed sample of the Cb component and the reconstructed sample of the Cr component which are obtained by the adder 1635.

According to an embodiment of the disclosure, the joint chroma residual sample of the current block may be determined by performing a SATD or RDO calculation and may be encoded.

According to an embodiment of the disclosure, the encoder 1640 may additionally encode the Cb component prediction information and the Cr component prediction information of the current block which are obtained by the generator 1610.

According to an embodiment of the disclosure, the AI-based image processor 1630 may apply obtained scale factors respectively to the residual sample of the Cb component of the current block and the residual sample of the Cr component of the current block, thereby obtaining a refined residual sample of the Cb component of the current block and a refined residual sample of the Cr component of the current block. In detail, the AI-based image processor 1630 may refine the residual sample of the Cb component by applying a first scale factor to the residual sample of the Cb component, and may refine the residual sample of the Cr component by applying a second scale factor to the residual sample of the Cr component. The adder 1635 may obtain the reconstructed sample of the Cb component by adding the refined residual sample of the Cb component to the prediction sample of the Cb component, and may obtain the reconstructed sample of the Cr component by adding the refined residual sample of the Cr component to the prediction sample of the Cr component. The encoder 1640 may additionally encode an index indicating a scale factor in a scale factor set by using the reconstructed sample of the Cb component and the reconstructed sample of the Cr component which are obtained by the adder 1635.

According to an embodiment of the disclosure, the scale factor set may be determined according to at least one of a type of a slice including the current block or a type of the current block, from among a plurality of scale factor sets.

According to an embodiment of the disclosure, the plurality of scale factor sets may include [1, ½, ¼] and [1, ½].

According to an embodiment of the disclosure, an AI-based video decoding method may include: obtaining, from a bitstream, a joint chroma residual sample of a current block, Cb component prediction information of the current block, and Cr component prediction information of the current block; obtaining a prediction sample of the Cb component of the current block and a prediction sample of the Cr component of the current block, based on the Cb component prediction information and the Cr component prediction information; and reconstructing the current block by obtaining a reconstructed sample of the Cb component of the current block and a reconstructed sample of the Cr component of the current block by applying the joint chroma residual sample, the prediction sample of the Cb component, and the prediction sample of the Cr component to a neural network.

According to an embodiment of the disclosure, the AI-based video decoding method may have an effect of further efficiently reconstructing the Cb component and the Cr component by using prediction information of the Cb component and the Cr component via the neural network trained with respect to a more general, more local and more specific relation between the Cb component and the Cr component, instead of a fixed correlation between the Cb component and the Cr component.

According to an embodiment of the disclosure, an AI-based video decoding method may include: obtaining, from a bitstream, a joint chroma residual sample of a current block, Cb component prediction information of the current block, and Cr component prediction information of the current block; obtaining a prediction sample of the Cb component of the current block and a prediction sample of the Cr component of the current block, based on the Cb component prediction information and the Cr component prediction information; obtaining at least one of a residual sample of the Cb component of the current block or a residual sample of the Cr component of the current block by applying the joint chroma residual sample, the prediction sample of the Cb component, and the prediction sample of the Cr component to the neural network; and reconstructing the current block by obtaining the reconstructed sample of the Cb component and the reconstructed sample of the Cr component by using at least one of the residual sample of the Cb component or the residual sample of the Cr component, the prediction sample of the Cb component, and the prediction sample of the Cr component.

According to an embodiment of the disclosure, the AI-based video decoding method may have an effect of further efficiently reconstructing the Cr component and the Cr component by using at least one of the residual samples of the Cb component and the Cr component by further accurately obtaining at least one of the residual samples of the Cb component and the Cr component via the neural network.

According to an embodiment of the disclosure, the AI-based video decoding method may include refining the residual sample of the Cb component by applying a first scale factor to the residual sample of the Cb component obtained via the neural network, and refining the residual sample of the Cr component by applying a second scale factor to the residual sample of the Cr component.

According to an embodiment of the disclosure, the AI-based video decoding method may have an effect of obtaining a further refined residual sample by scaling the residual samples of the Cb component and the Cr component, which are obtained via the neural network, before adding the residual samples of the Cb component and the Cr component to the prediction samples of the Cb component and the Cr component.

According to an embodiment of the disclosure, the first scale factor and the second scale factor may be determined according to a scale factor value that is indicated by an index obtained from the bitstream and is included in a scale factor set.

According to an embodiment of the disclosure, the AI-based video decoding method may have an effect of further efficiently refining the residual samples of the Cb component and the Cr component by applying an appropriate scale factor according to the index obtained from the bitstream.

According to an embodiment of the disclosure, the scale factor set may be determined according to at least one of a type of a slice including the current block or a type of the current block, from among a plurality of scale factor sets.

According to an embodiment of the disclosure, the AI-based video decoding method may have an effect of further efficiently refining the residual samples of the Cb component and the Cr component by using an appropriate scale factor set according to a type of the current block by determining the scale factor set according to at least one of a slice including the current block or the type of the current block from among the plurality of scale factor sets.

According to an embodiment of the disclosure, the plurality of scale factor sets may include [1, ½, ¼] and [1, ½].

According to an embodiment of the disclosure, the AI-based video decoding method may have an effect of further efficiently refining the residual samples of the Cb component and the Cr component by using the plurality of scale factor sets.

According to an embodiment of the disclosure, the neural network may be trained to determine a correlation between Cb and Cr for each sample of a current block for training by receiving an input value of a joint chroma residual sample for training, a prediction sample of a Cb component for training, and a prediction sample of a Cr component for training.

According to an embodiment of the disclosure, for the correlation between Cb and Cr, weights may be respectively determined for the residual sample of the Cb component and the residual sample of the Cr component.

According to an embodiment of the disclosure, the AI-based video decoding method may have an effect of further accurately determining values of the residual samples of the Cb component and the Cr component for each sample of the current block, as the neural network learns the correlation between Cb and Cr for each sample of the current block.

According to an embodiment of the disclosure, an input value of the neural network may include at least one of a quantization step size of the current block, a quantization error of the current block, or a block obtained by downsampling a reconstructed luma block based on a chroma format, the reconstructed luma block corresponding to a current chroma block of the current block.

According to an embodiment of the disclosure, the AI-based video decoding method may have an effect of further efficiently removing a quantization error in the current block during reconstruction of the current block by additionally using a quantization error or a quantization step size.

According to an embodiment of the disclosure, the AI-based video decoding method may have an effect of further efficiently reconstructing the Cb component and the Cr component of the current block by using information of a reconstructed luma block by additionally using the block obtained by downsampling the reconstructed luma block based on the chroma format.

According to an embodiment of the disclosure, the neural network may be trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

According to an embodiment of the disclosure, the AI-based video decoding method may have an effect of reconstructing the reconstructed sample of the Cb component and the reconstructed sample of the Cr component, which are obtained via the neural network, to be almost the same as an original sample of the Cb component and an original sample of the Cr component, as the neural network is trained to minimize a plurality of pieces of lossy information corresponding to a difference between the original sample and the reconstructed sample of each of the Cb component and the Cr component.

According to an embodiment of the disclosure, a model of the neural network may be determined based on Cb cbf information indicating whether a transformation coefficient level of the current block with respect to the Cb component includes a non-zero Cb component, and Cr cbf information indicating whether a transformation coefficient level of the current block with respect to the Cr component includes a non-zero Cr component, the Cb cbf information and the Cr cbf information being obtained from the bitstream.

According to an embodiment of the disclosure, the AI-based video decoding method may have an effect of further efficiently reconstructing the Cb component and the Cr component of the current block, based on a condition of the current block such as the Cb cbf information and the Cr cbf information, as one of trained models of the neural network is appropriately selected according to the Cb cbf information and the Cr cbf information.

According to an embodiment of the disclosure, the model of the neural network may be determined according to at least one of a type of the current block, a type of a slice including the current block, a QP range of the slice, or whether it is a Cb component or a Cr component of the current block.

According to an embodiment of the disclosure, the AI-based video decoding method may have an effect of further efficiently reconstructing the Cb component and the Cr component of the current block, based on a condition of the current block such as a type of the current block, a type of a slice including the current block, a QP range of the slice, or whether it is a Cb component or a Cr component of the current block, as one of models of the neural network which are trained according to various conditions is appropriately selected.

According to an embodiment of the disclosure, an AI-based video decoding apparatus may include: a memory storing at least one instruction; and at least one processor configured to operate according to the at least one instruction. The at least one processor may be configured to obtain, from a bitstream, a joint chroma residual sample of a current block, Cb component prediction information of the current block, and Cr component prediction information of the current block. The at least one processor may be configured to determine a prediction sample of the Cb component of the current block and a prediction sample of the Cr component of the current block, based on the Cb component prediction information and the Cr component prediction information. The at least one processor may be configured to reconstruct the current block by obtaining a reconstructed sample of the Cb component of the current block and a reconstructed sample of the Cr component of the current block by applying the joint chroma residual sample, the prediction sample of the Cb component, and the prediction sample of the Cr component to a neural network.

According to an embodiment of the disclosure, the AI-based video decoding apparatus may have an effect of further efficiently reconstructing the Cb component and the Cr component by using prediction information of the Cb component and the Cr component via the neural network trained with respect to a more general, more local and more specific relation between the Cb component and the Cr component, instead of a fixed correlation between the Cb component and the Cr component.

According to an embodiment of the disclosure, the at least one processor may be configured to obtain at least one of a residual sample of the Cb component of the current block or a residual sample of the Cr component of the current block by applying the joint chroma residual sample, the prediction sample of the Cb component, and the prediction sample of the Cr component to the neural network. The at least one processor may be configured to reconstruct the current block by obtaining the reconstructed sample of the Cb component and the reconstructed sample of the Cr component by using at least one of the residual sample of the Cb component or the residual sample of the Cr component, the prediction sample of the Cb component, and the prediction sample of the Cr component.

According to an embodiment of the disclosure, the AI-based video decoding apparatus may have an effect of further efficiently reconstructing the Cr component and the Cr component by using at least one of the residual samples of the Cb component and the Cr component by further accurately obtaining at least one of the residual samples of the Cb component and the Cr component via the neural network.

According to an embodiment of the disclosure, the at least one processor may be configured to refine the residual sample of the Cb component by applying a first scale factor to the residual sample of the Cb component obtained via the network, and refine the residual sample of the Cr component by applying a second scale factor to the residual sample of the Cr component.

According to an embodiment of the disclosure, the AI-based video decoding apparatus may have an effect of obtaining a further refined residual sample by scaling the residual samples of the Cb component and the Cr component, which are obtained via the neural network, before adding the residual samples of the Cb component and the Cr component to the prediction samples of the Cb component and the Cr component.

According to an embodiment of the disclosure, the first scale factor and the second scale factor may be determined according to a scale factor value that is indicated by an index obtained from the bitstream and is included in a scale factor set.

According to an embodiment of the disclosure, the AI-based video decoding apparatus may have an effect of further efficiently refining the residual samples of the Cb component and the Cr component by applying an appropriate scale factor according to the index obtained from the bitstream.

According to an embodiment of the disclosure, the scale factor set may be determined according to at least one of a type of a slice including the current block or a type of the current block, from among a plurality of scale factor sets.

According to an embodiment of the disclosure, the AI-based video decoding apparatus may have an effect of further efficiently refining the residual samples of the Cb component and the Cr component by using an appropriate scale factor set according to a type of the current block by determining the scale factor set according to at least one of a slice including the current block or the type of the current block from among the plurality of scale factor sets.

According to an embodiment of the disclosure, the plurality of scale factor sets may include [1, ½, ¼] and [1, ½].

According to an embodiment of the disclosure, the AI-based video decoding apparatus may have an effect of further efficiently refining the residual samples of the Cb component and the Cr component by using the plurality of scale factor sets.

According to an embodiment of the disclosure, the neural network may be trained to determine a correlation between Cb and Cr for each sample of a current block for training by receiving an input value of a joint chroma residual sample for training, a prediction sample of a Cb component for training, and a prediction sample of a Cr component for training.

According to an embodiment of the disclosure, for the correlation between Cb and Cr, weights may be respectively determined for the residual sample of the Cb component and the residual sample of the Cr component.

According to an embodiment of the disclosure, the AI-based video decoding apparatus may have an effect of further accurately determining values of the residual samples of the Cb component and the Cr component for each sample of the current block, as the neural network learns the correlation between Cb and Cr for each sample of the current block.

According to an embodiment of the disclosure, an input value of the neural network may include at least one of a quantization step size of the current block, a quantization error of the current block, or a block obtained by downsampling a reconstructed luma block based on a chroma format, the reconstructed luma block corresponding to a current chroma block of the current block.

According to an embodiment of the disclosure, the AI-based video decoding apparatus may have an effect of further efficiently removing a quantization error in the current block during reconstruction of the current block by additionally using a quantization error or a quantization step size.

According to an embodiment of the disclosure, the AI-based video decoding apparatus may have an effect of further efficiently reconstructing the Cb component and the Cr component of the current block by using information of a reconstructed luma block by additionally using the block obtained by downsampling the reconstructed luma block based on the chroma format.

According to an embodiment of the disclosure, the neural network may be trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

According to an embodiment of the disclosure, the AI-based video decoding apparatus may have an effect of reconstructing the reconstructed sample of the Cb component and the reconstructed sample of the Cr component, which are obtained via the neural network, to be almost the same as an original sample of the Cb component and an original sample of the Cr component, as the neural network is trained to minimize a plurality of pieces of lossy information corresponding to a difference between the original sample and the reconstructed sample of each of the Cb component and the Cr component.

According to an embodiment of the disclosure, a model of the neural network may be determined based on Cb cbf information indicating whether a transformation coefficient level of the current block with respect to the Cb component includes a non-zero Cb component, and Cr cbf information indicating whether a transformation coefficient level of the current block with respect to the Cr component includes a non-zero Cr component, the Cb cbf information and the Cr cbf information being obtained from the bitstream.

According to an embodiment of the disclosure, the AI-based video decoding apparatus may have an effect of further efficiently reconstructing the Cb component and the Cr component of the current block, based on a condition of the current block such as the Cb cbf information and the Cr cbf information, as one of trained models of the neural network is appropriately selected according to the Cb cbf information and the Cr cbf information.

According to an embodiment of the disclosure, the model of the neural network may be determined according to at least one of a type of the current block, a type of a slice including the current block, a QP range of the slice, or whether it is a Cb component or a Cr component of the current block.

According to an embodiment of the disclosure, the AI-based video decoding apparatus may have an effect of further efficiently reconstructing the Cb component and the Cr component of the current block, based on a condition of the current block such as a type of the current block, a type of a slice including the current block, a QP range of the slice, or whether it is a Cb component or a Cr component of the current block, as one of models of the neural network which are trained according to various conditions is appropriately selected.

According to an embodiment of the disclosure, an AI-based video encoding method may include: generating an initial joint chroma residual sample of a current block, Cb component prediction information of the current block, and Cr component prediction information of the current block; determining a prediction sample of the Cb component of the current block and a prediction sample of the Cr component of the current block, based on the Cb component prediction information and the Cr component prediction information; and encoding a joint chroma residual sample of the current block by obtaining a reconstructed sample of the Cb component of the current block and a reconstructed sample of the Cr component of the current block by applying the initial joint chroma residual sample, the prediction sample of the Cb component, and the prediction sample of the Cr component to a neural network.

According to an embodiment of the disclosure, the AI-based video encoding method may have an effect of encoding a joint chroma residual sample capable of further efficiently reconstructing the Cb component and the Cr component by using prediction information of the Cb component and the Cr component via the neural network trained with respect to a more general, more local and more specific relation between the Cb component and the Cr component, instead of a fixed correlation between the Cb component and the Cr component.

According to an embodiment of the disclosure, an AI-based video encoding method may include: generating an initial joint chroma residual sample of a current block, Cb component prediction information of the current block, and Cr component prediction information of the current block; determining a prediction sample of the Cb component of the current block and a prediction sample of the Cr component of the current block, based on the Cb component prediction information and the Cr component prediction information; obtaining at least one of the residual sample of the Cb component of the current block or the residual sample of the Cr component of the current block by applying the initial joint chroma residual sample, the prediction sample of the Cb component, and the prediction sample of the Cr component to the neural network; and encoding a joint chroma residual sample of the current block by obtaining a reconstructed sample of the Cb component and a reconstructed sample of the Cr component by using at least one of the residual sample of the Cb component or the residual sample of the Cr component, the prediction sample of the Cb component, and the prediction sample of the Cr component.

According to an embodiment of the disclosure, the AI-based video encoding method may have an effect of encoding the joint chroma residual sample capable of further efficiently reconstructing the Cr component and the Cr component by using at least one of the residual samples of the Cb component and the Cr component by further accurately obtaining at least one of the residual samples of the Cb component and the Cr component via the neural network.

According to an embodiment of the disclosure, the AI-based video encoding method may include refining the residual sample of the Cb component by applying a first scale factor to the residual sample of the Cb component obtained via the neural network, and refining the residual sample of the Cr component by applying a second scale factor to the residual sample of the Cr component.

According to an embodiment of the disclosure, the AI-based video encoding method may have an effect of obtaining a further refined residual sample by scaling the residual samples of the Cb component and the Cr component, which are obtained via the neural network, before adding the residual samples of the Cb component and the Cr component to the prediction samples of the Cb component and the Cr component.

According to an embodiment of the disclosure, the first scale factor and the second scale factor may be encoded as an index indicating a scale factor value included in a scale factor set.

According to an embodiment of the disclosure, the AI-based video encoding method may have an effect of further efficiently refining the residual samples of the Cb component and the Cr component by encoding and signaling an index indicating an appropriate scale factor.

According to an embodiment of the disclosure, the scale factor set may be determined according to at least one of a type of a slice including the current block or a type of the current block, from among a plurality of scale factor sets.

According to an embodiment of the disclosure, the AI-based video encoding method may have an effect of further efficiently refining the residual samples of the Cb component and the Cr component by using an appropriate scale factor set according to a type of the current block by determining the scale factor set according to at least one of a slice including the current block or the type of the current block from among the plurality of scale factor sets.

According to an embodiment of the disclosure, the plurality of scale factor sets may include [1, ½, ¼] and [1, ½].

According to an embodiment of the disclosure, the AI-based video encoding method may have an effect of further efficiently refining the residual samples of the Cb component and the Cr component by using the plurality of scale factor sets.

According to an embodiment of the disclosure, the neural network may be trained to determine a correlation between Cb and Cr for each sample of a current block for training by receiving an input value of a joint chroma residual sample for training, a prediction sample of a Cb component for training, and a prediction sample of a Cr component for training.

According to an embodiment of the disclosure, for the correlation between Cb and Cr, weights may be respectively determined for the residual sample of the Cb component and the residual sample of the Cr component.

According to an embodiment of the disclosure, the AI-based video encoding method may have an effect of further accurately determining values of the residual samples of the Cb component and the Cr component for each sample of the current block, as the neural network learns the correlation between Cb and Cr for each sample of the current block.

According to an embodiment of the disclosure, an input value of the neural network may include at least one of a quantization step size of the current block, a quantization error of the current block, or a block obtained by downsampling a reconstructed luma block based on a chroma format, the reconstructed luma block corresponding to a current chroma block of the current block.

According to an embodiment of the disclosure, the AI-based video encoding method may have an effect of further efficiently removing a quantization error in the current block during reconstruction of the current block by additionally using a quantization error or a quantization step size.

According to an embodiment of the disclosure, the AI-based video encoding method may have an effect of further efficiently reconstructing the Cb component and the Cr component of the current block by using information of a reconstructed luma block by additionally using the block obtained by downsampling the reconstructed luma block based on the chroma format.

According to an embodiment of the disclosure, the neural network may be trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

According to an embodiment of the disclosure, the AI-based video encoding method may have an effect of reconstructing the reconstructed sample of the Cb component and the reconstructed sample of the Cr component, which are obtained via the neural network, to be almost the same as an original sample of the Cb component and an original sample of the Cr component, as the neural network is trained to minimize a plurality of pieces of lossy information corresponding to a difference between the original sample and the reconstructed sample of each of the Cb component and the Cr component.

According to an embodiment of the disclosure, a model of the neural network may be determined based on Cb cbf information indicating whether a transformation coefficient level of the current block with respect to the Cb component includes a non-zero Cb component, and Cr cbf information indicating whether a transformation coefficient level of the current block with respect to the Cr component includes a non-zero Cr component.

According to an embodiment of the disclosure, the AI-based video encoding method may have an effect of further efficiently reconstructing the Cb component and the Cr component of the current block, based on a condition of the current block such as the Cb cbf information and the Cr cbf information, as one of trained models of the neural network is appropriately selected according to the Cb cbf information and the Cr cbf information.

According to an embodiment of the disclosure, the model of the neural network may be determined according to at least one of a type of the current block, a type of a slice including the current block, a QP range of the slice, or whether it is a Cb component or a Cr component of the current block.

According to an embodiment of the disclosure, the AI-based video encoding method may have an effect of further efficiently reconstructing the Cb component and the Cr component of the current block, based on a condition of the current block such as a type of the current block, a type of a slice including the current block, a QP range of the slice, or whether it is a Cb component or a Cr component of the current block, as one of models of the neural network which are trained according to various conditions is appropriately selected.

According to an embodiment of the disclosure, an AI-based video encoding apparatus may include: a memory storing at least one instruction; and at least one processor configured to operate according to the at least one instruction. The at least one processor may be configured to generate an initial joint chroma residual sample of a current block, Cb component prediction information of the current block, and Cr component prediction information of the current block. The at least one processor may be configured to determine a prediction sample of the Cb component of the current block and a prediction sample of the Cr component of the current block, based on the Cb component prediction information and the Cr component prediction information. The at least one processor may be configured to encode a joint chroma residual sample of the current block by obtaining a reconstructed sample of the Cb component of the current block and a reconstructed sample of the Cr component of the current block by applying the initial joint chroma residual sample, the prediction sample of the Cb component, and the prediction sample of the Cr component to a neural network.

According to an embodiment of the disclosure, the AI-based video encoding apparatus may have an effect of encoding a joint chroma residual sample capable of further efficiently reconstructing the Cb component and the Cr component by using prediction information of the Cb component and the Cr component via the neural network trained with respect to a more general, more local and more specific relation between the Cb component and the Cr component, instead of a fixed correlation between the Cb component and the Cr component.

According to an embodiment of the disclosure, an AI-based video encoding apparatus may include: a memory storing at least one instruction; and at least one processor configured to operate according to the at least one instruction. The at least one processor may be configured to generate an initial joint chroma residual sample of a current block, Cb component prediction information of the current block, and Cr component prediction information of the current block. The at least one processor may be configured to determine a prediction sample of the Cb component of the current block and a prediction sample of the Cr component of the current block, based on the Cb component prediction information and the Cr component prediction information. The at least one processor may be configured to obtain at least one of the residual sample of the Cb component of the current block or the residual sample of the Cr component of the current block by applying the initial joint chroma residual sample, the prediction sample of the Cb component, and the prediction sample of the Cr component to the neural network. The at least one processor may be configured to encode a joint chroma residual sample of the current block by obtaining a reconstructed sample of the Cb component and a reconstructed sample of the Cr component by using at least one of the residual sample of the Cb component or the residual sample of the Cr component, the prediction sample of the Cb component, and the prediction sample of the Cr component.

According to an embodiment of the disclosure, the AI-based video encoding apparatus may have an effect of encoding the joint chroma residual sample capable of further efficiently reconstructing the Cr component and the Cr component by using at least one of the residual samples of the Cb component and the Cr component by further accurately obtaining at least one of the residual samples of the Cb component and the Cr component via the neural network.

According to an embodiment of the disclosure, the at least one processor may be configured to refine the residual sample of the Cb component by applying a first scale factor to the residual sample of the Cb component obtained via the network, and refine the residual sample of the Cr component by applying a second scale factor to the residual sample of the Cr component.

According to an embodiment of the disclosure, the AI-based video encoding apparatus may have an effect of obtaining a further refined residual sample by scaling the residual samples of the Cb component and the Cr component, which are obtained via the neural network, before adding the residual samples of the Cb component and the Cr component to the prediction samples of the Cb component and the Cr component.

According to an embodiment of the disclosure, the first scale factor and the second scale factor may be encoded as an index indicating a scale factor value included in a scale factor set.

According to an embodiment of the disclosure, the AI-based video encoding apparatus may have an effect of further efficiently refining the residual samples of the Cb component and the Cr component by encoding and signaling an index indicating an appropriate scale factor.

According to an embodiment of the disclosure, the scale factor set may be determined according to at least one of a type of a slice including the current block or a type of the current block, from among a plurality of scale factor sets.

According to an embodiment of the disclosure, the AI-based video encoding apparatus may have an effect of further efficiently refining the residual samples of the Cb component and the Cr component by using an appropriate scale factor set according to a type of the current block by determining the scale factor set according to at least one of a slice including the current block or the type of the current block from among the plurality of scale factor sets.

According to an embodiment of the disclosure, the plurality of scale factor sets may include [1, ½, ¼] and [1, ½].

According to an embodiment of the disclosure, the AI-based video encoding apparatus may have an effect of further efficiently refining the residual samples of the Cb component and the Cr component by using the plurality of scale factor sets.

According to an embodiment of the disclosure, the neural network may be trained to determine a correlation between Cb and Cr for each sample of a current block for training by receiving an input value of a joint chroma residual sample for training, a prediction sample of a Cb component for training, and a prediction sample of a Cr component for training.

According to an embodiment of the disclosure, for the correlation between Cb and Cr, weights may be respectively determined for the residual sample of the Cb component and the residual sample of the Cr component.

According to an embodiment of the disclosure, the AI-based video encoding apparatus may have an effect of further accurately determining values of the residual samples of the Cb component and the Cr component for each sample of the current block, as the neural network learns the correlation between Cb and Cr for each sample of the current block.

According to an embodiment of the disclosure, an input value of the neural network may include at least one of a quantization step size of the current block, a quantization error of the current block, or a block obtained by downsampling a reconstructed luma block based on a chroma format, the reconstructed luma block corresponding to a current chroma block of the current block.

According to an embodiment of the disclosure, the AI-based video encoding apparatus may have an effect of further efficiently removing a quantization error in the current block during reconstruction of the current block by additionally using a quantization error or a quantization step size.

According to an embodiment of the disclosure, the AI-based video encoding apparatus may have an effect of further efficiently reconstructing the Cb component and the Cr component of the current block by using information of a reconstructed luma block by additionally using the block obtained by downsampling the reconstructed luma block based on the chroma format.

According to an embodiment of the disclosure, the neural network may be trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

According to an embodiment of the disclosure, the AI-based video encoding apparatus may have an effect of reconstructing the reconstructed sample of the Cb component and the reconstructed sample of the Cr component, which are obtained via the neural network, to be almost the same as an original sample of the Cb component and an original sample of the Cr component, as the neural network is trained to minimize a plurality of pieces of lossy information corresponding to a difference between the original sample and the reconstructed sample of each of the Cb component and the Cr component.

According to an embodiment of the disclosure, a model of the neural network may be determined based on Cb cbf information indicating whether a transformation coefficient level of the current block with respect to the Cb component includes a non-zero Cb component, and Cr cbf information indicating whether a transformation coefficient level of the current block with respect to the Cr component includes a non-zero Cr component.

According to an embodiment of the disclosure, the AI-based video encoding apparatus may have an effect of further efficiently reconstructing the Cb component and the Cr component of the current block, based on a condition of the current block such as the Cb cbf information and the Cr cbf information, as one of trained models of the neural network is appropriately selected according to the Cb cbf information and the Cr cbf information.

According to an embodiment of the disclosure, the model of the neural network may be determined according to at least one of a type of the current block, a type of a slice including the current block, a QP range of the slice, or whether it is a Cb component or a Cr component of the current block.

According to an embodiment of the disclosure, the AI-based video encoding apparatus may have an effect of further efficiently reconstructing the Cb component and the Cr component of the current block, based on a condition of the current block such as a type of the current block, a type of a slice including the current block, a QP range of the slice, or whether it is a Cb component or a Cr component of the current block, as one of models of the neural network which are trained according to various conditions is appropriately selected.

A machine-readable storage medium may be provided in the form of a non-transitory storage medium. Here, the 'non-transitory storage medium' may mean that the storage medium is a tangible device and does not include signals (e.g., electromagnetic waves), and may mean that data may be permanently or temporarily stored in the storage medium. For example, the 'non-transitory storage medium' may include a buffer in which data is temporarily stored.

According to an embodiment of the disclosure, the method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store or directly between two user apparatuses (e.g., smartphones). In a case of online distribution, at least a portion of the computer program product (e.g., a downloadable application) may be at least temporarily stored or temporarily generated in a machine-readable storage medium such as a manufacturer's server, a server of an application store, or a memory of a relay server.

What is claimed is:

1. An artificial intelligence (AI)-based video decoding method comprising:

obtaining, from a bitstream, a joint chroma residual sample of a current block, Cb component prediction information of the current block, and Cr component prediction information of the current block, the current block comprising a Cb component and a Cr component;

determining a prediction sample of the Cb component of the current block based on at least the Cb component prediction information;

determining a prediction sample of the Cr component of the current block based on at least the Cr component prediction information; and reconstructing the current block by obtaining a reconstructed sample of the Cb component of the current block and a reconstructed sample of the Cr component of the current block as an output of a neural network for reconstructing the Cb component and the Cr Component by inputting data obtained by concatenating the joint chroma residual sample, the prediction sample of the Cb component, and the prediction sample of the Cr component for each sample of the current block to the neural network, wherein the joint chroma residual sample represents residual information jointly corresponding to the Cb component and the Cr component of the current block, wherein the neural network is trained to determine a correlation between the Cb component and the Cr component for each sample of the current block by receiving the joint chroma residual sample, the prediction sample of the Cb component, and the prediction sample of the Cr component as inputs, wherein a plurality of models for the neural network are determined based on whether a prediction type of the current block is an intra prediction or an inter prediction, and wherein a model of the neural network is determined from among the plurality of models.

2. The AI-based video decoding method of claim 1, wherein the reconstructing of the current block further comprises:

obtaining at least one of a residual sample of the Cb component of the current block or a residual sample of the Cr component of the current block by inputting the joint chroma residual sample, the prediction sample of the Cb component, and the prediction sample of the Cr component to the neural network; and reconstructing the current block by obtaining the reconstructed sample of the Cb component and the reconstructed sample of the Cr component by using at least one of the residual sample of the Cb component or the residual sample of the Cr component, the prediction sample of the Cb component, and the prediction sample of the Cr component.

3. The AI-based video decoding method of claim 2, wherein the obtaining of the at least one of the residual sample of the Cb component or the residual sample of the Cr component further comprises:

refining the residual sample of the Cb component by applying a first scale factor to the residual sample of the Cb component obtained via the neural network, and refining the residual sample of the Cr component by applying a second scale factor to the residual sample of the Cr component obtained via the neural network.

4. The AI-based video decoding method of claim 3, wherein the first scale factor and the second scale factor are determined according to a scale factor value that is indicated by an index obtained from the bitstream and is comprised in a scale factor set.

5. The AI-based video decoding method of claim 4, wherein the scale factor set is determined according to at least one of a type of a slice comprising the current block or a type of the current block, from among a plurality of scale factor sets.

6. The AI-based video decoding method of claim 5, wherein the plurality of scale factor sets comprise [1, 1/2, 1/4] and [1, 1/2].

7. The AI-based video decoding method of claim 2, wherein, for the correlation between Cb and Cr, one or more weights are respectively determined for the residual sample of the Cb component and the residual sample of the Cr component.

8. The AI-based video decoding method of claim 2, wherein input values of the neural network further comprise at least one of a quantization step size of the current block, a quantization error of the current block, or a block obtained by downsampling a reconstructed luma block based on a chroma format, the reconstructed luma block corresponding to a current chroma block of the current block.

9. The AI-based video decoding method of claim 1, wherein the neural network is trained according to first lossy information corresponding to a difference between an original sample of a Cb component of an original block for training and a reconstructed sample of a Cb component of a reconstructed block for training which is obtained via the neural network, and second lossy information corresponding to a difference between an original sample of a Cr component of the original block for training and a reconstructed sample of a Cr component of the reconstructed block for training which is obtained via the neural network.

10. The AI-based video decoding method of claim 9, wherein the model of the neural network is determined based on Cb coded block flag (cbf) information indicating whether a transformation coefficient level of the current block with respect to the Cb component comprises a non-zero Cb component, and Cr cbf information indicating whether a transformation coefficient level of the current block with respect to the Cr component comprises a non-zero Cr component, the Cb cbf information and the Cr cbf information being obtained from the bitstream.

11. The AI-based video decoding method of claim 10, wherein the model of the neural network is determined according to at least one of a type of a slice comprising the current block, a QP range of the slice, or the Cb component and the Cr component of the current block.

12. An artificial intelligence (AI)-based video decoding apparatus comprising:

a memory storing at least one instruction; and at least one processor configured to operate according to the at least one instruction, wherein the at least one processor is further configured to:

obtain, from a bitstream, a joint chroma residual sample of a current block, Cb component prediction information of the current block, and Cr component prediction information of the current block, the current block comprising a Cb component and a Cr component, determine a prediction sample of the Cb component of the current block based on at least the Cb component prediction information, determine a prediction sample of the Cr component of the current block based on at least the Cr component prediction information, and reconstruct the current block by obtaining a reconstructed sample of the Cb component of the current block and a reconstructed sample of the Cr component of the current block as an output of a neural network for reconstructing the Cb component and the Cr component by inputting data obtained by concatenating the joint chroma residual sample, the prediction sample of the Cb component, and the prediction sample of the Cr component for each sample of the current block to the neural network, wherein the joint chroma residual sample represents residual information jointly corresponding to the Cb component and the Cr component of the current block, wherein the neural network is trained to determine a correlation between the Cb component and the Cr component for each sample of the current block by receiving the joint chroma residual sample, the prediction sample of the Cb component, and the prediction sample of the Cr component as inputs, wherein a plurality of models for the neural network are determined based on whether a prediction type of the current block is an intra prediction or an inter prediction, and wherein a model of the neural network is determined from among the plurality of models.

13. The AI-based video decoding apparatus of claim 12, wherein the at least one processor is further configured to reconstruct the current block so as to obtain at least one of a residual sample of the Cb component of the current block or a residual sample of the Cr component of the current block by inputting the joint chroma residual sample, the prediction sample of the Cb component, and the prediction sample of the Cr component to the neural network, and reconstruct the current block by obtaining the reconstructed sample of the Cb component and the reconstructed sample of the Cr component by using at least one of the residual sample of the Cb component or the residual sample of the Cr component, the prediction sample of the Cb component, and the prediction sample of the Cr component.

14. An artificial intelligence (AI)-based video encoding method comprising:

generating an initial joint chroma residual sample of a current block, Cb component prediction information of the current block, and Cr component prediction information of the current block;

determining a prediction sample of a Cb component of the current block based on at least the Cb component prediction information, determining a prediction sample of a Cr component of the current block based on at least the Cr component prediction information; and encoding a joint chroma residual sample of the current block by obtaining a reconstructed sample of the Cb component of the current block and a reconstructed sample of the Cr component of the current block as an output of a neural network for reconstructing the Cb component and the Cr component by inputting data obtained by concatenating the initial joint chroma residual sample, the prediction sample of the Cb component, and the prediction sample of the Cr component for each sample of the current block to the neural network, wherein the joint chroma residual sample represents residual information jointly corresponding to the Cb component and the Cr component of the current block, wherein the neural network is trained to determine a correlation between the Cb component and the Cr component for each sample of the current block by receiving the joint chroma residual sample, the prediction sample of the Cb component, and the prediction sample of the Cr component as inputs, wherein a plurality of models for the neural network are determined based on whether a prediction type of the current block is an intra prediction or an inter prediction, and wherein a model of the neural network is determined from among the plurality of models.

* * * * *